(12) United States Patent
Leary

(10) Patent No.: US 12,401,909 B2
(45) Date of Patent: Aug. 26, 2025

(54) TIMING DETERMINATION IN CAMERA-BASED MOTION MEASUREMENT SYSTEMS

(71) Applicant: Matthew James Leary, Denver, CO (US)

(72) Inventor: Matthew James Leary, Denver, CO (US)

( * ) Notice: Subject to any disclaimer, the term of this patent is extended or adjusted under 35 U.S.C. 154(b) by 109 days.

(21) Appl. No.: 18/428,191

(22) Filed: Jan. 31, 2024

(65) Prior Publication Data

US 2024/0187739 A1 Jun. 6, 2024

(51) Int. Cl.
*H04N 23/73* (2023.01)
*A63B 69/36* (2006.01)
*H04N 23/695* (2023.01)

(52) U.S. Cl.
CPC ......... *H04N 23/73* (2023.01); *A63B 69/3658* (2013.01); *H04N 23/695* (2023.01)

(58) Field of Classification Search
CPC ... H04N 23/73; H04N 23/695; A63B 69/3658
See application file for complete search history.

(56) References Cited

U.S. PATENT DOCUMENTS

| | | |
|---|---|---|
| 4,136,387 A | 1/1979 | Sullivan |
| 5,471,383 A | 11/1995 | Gobush |
| 6,223,007 B1 | 4/2001 | Kitagawa et al. |
| 6,302,802 B1 | 10/2001 | Pao |
| 6,458,035 B1 | 10/2002 | Katayama |
| 6,592,465 B2 | 7/2003 | Lutz |
| 7,214,138 B1 | 5/2007 | Stivers |
| 7,324,663 B2 | 1/2008 | Kiraly |
| 7,395,696 B2 | 7/2008 | Bissonnette |
| 7,497,780 B2 | 3/2009 | Kiraly |
| 7,542,130 B2 | 6/2009 | Saegusa |
| 7,580,620 B2 | 8/2009 | Raskar |
| 7,641,565 B2 | 1/2010 | Kiraly |
| 8,150,209 B2 | 4/2012 | Wajs |

(Continued)

FOREIGN PATENT DOCUMENTS

WO 2012 002732 A1 1/2012

OTHER PUBLICATIONS

Gardiner, Martin, The Theory of Golf Simulators, extracted from public website https://www.golf-simulators.com/Future.html, dated at least as early as Jan. 1, 2024, 45 pages.

(Continued)

*Primary Examiner* — Christopher K Peterson

(57) ABSTRACT

A method may include using a camera to capture a group of image exposures of an object, where each exposure is illuminated by a respective illumination pulse from a sequence of pulses. The method may further include determining pulse ratios of pairs of the time intervals that exist between the pulses, as well as a distance ratio of two of the distances between two pairs of the exposures. Additionally, the method may include comparing the distance ratio to the pulse ratios to determine a correlation between the illumination pulses and the exposures. The method may also further include using the correlation to determine characteristics of the object's motion, such as the object's velocity, position, speed, trajectory, orientation or spin rates.

20 Claims, 8 Drawing Sheets

(56) References Cited

U.S. PATENT DOCUMENTS

| | | | |
|---|---|---|---|
| 8,328,653 | B2 | 12/2012 | Lock |
| 8,951,138 | B2 | 2/2015 | Kiraly |
| 9,055,226 | B2 | 6/2015 | Densham |
| 9,616,311 | B2 | 4/2017 | Nicora |
| 9,747,697 | B2 | 8/2017 | Densham |
| 9,868,044 | B2 | 1/2018 | Johnson |
| 10,058,733 | B2 | 8/2018 | Nicora |
| 10,338,209 | B2 | 7/2019 | Johnson |
| 10,668,350 | B2 | 6/2020 | Hightower |
| 10,775,492 | B2 | 9/2020 | Johnson |
| 10,902,612 | B2 | 1/2021 | Tofolo |
| 2004/0030527 | A1 | 2/2004 | Rankin |
| 2005/0026710 | A1* | 2/2005 | Pao .............. A63B 71/06 473/141 |
| 2005/0215338 | A1 | 9/2005 | Miyamoto |
| 2006/0281572 | A1 | 12/2006 | Gobush |
| 2007/0202959 | A1 | 8/2007 | Rankin |
| 2007/0270232 | A1 | 11/2007 | Rankin |
| 2010/0151957 | A1 | 6/2010 | Hohla |
| 2011/0273562 | A1* | 11/2011 | Dawe .............. A63B 69/3658 348/139 |
| 2013/0324310 | A1 | 12/2013 | Leech |
| 2016/0173739 | A1 | 6/2016 | Madson |
| 2019/0297241 | A1* | 9/2019 | Kimura .............. G01B 11/026 |
| 2023/0343001 | A1 | 10/2023 | Okur |

OTHER PUBLICATIONS

GSA Golf, Pages from public website https://www.golf-simulators.com, dated at least as early as Jan. 1, 2024, 350 pages.

Imai, Yuta et al., Estimation of a Large Relative Rotation between Two Images of a Fast Spinning Marker-less Golf Ball, 2016 IEEE/SICE International Symposium on System Integration (SII), Sapporo, Japan, 2016, pp. 556-561, doi: 10.1109/SII.2016.7844057, 6 pages.

Zhang, Tianxiao, Efficient Golf Ball Detection and Tracking Based on Convolutional Neural Networks and Kalman Filter, Cornell ArXiv, Apr. 21, 2021, 10 pages.

Gardiner, Martin, The Physics of Golf, extracted from public website https://www.golf-simulators.com/physics.html, dated at least as early as Mar. 27, 2023, 15 pages.

Tamaki, Toru, et al. Measuring Ball Spin by Image Registration, IFAC Proceedings Volumes, vol. 43, Issue 18, 2010, 6 pages.

Burglund, Brett, and Street, Golf Ball Flight Dynamics, available at Union College website (https://www.math.union.edu/~wangj/courses/previous/math238w13/Golf%20Ball%20Flight%20Dynamics2.pdf), at least as early as May 13, 2011,19 pages.

Leary, Matthew, Transform (project? warp?) each 2D point of a photo of a sphere (of known radius/distance) to its corresponding 3D coordinates on the (hemi)sphere, available at https://stackoverflow.com/questions/76231897/transform-project-warp-each-2d-point-of-a-photo-of-a-sphere-of-known-radius, at least as early as May 11, 2023, 8 pages.

Author Unknown, A Model Projecting The Theoretical Flight of A Golf Ball, available at https://bcphysics.weebly.com/uploads/1/7/3/7/17375679/flight_of_golf_ball_-_sample_ee.pdf, 22 pages.

Libuda, Lars, et al., Ellipse detection in digital image data using geometric features, International Conference on Computer Vision Theory and Applications (2006), 6 pages.

Fornaciari, Michele et al., A fast and effective ellipse detector for embedded vision applications, Pattern Recognition, vol. 47, Issue 11, 2014, s17 pages.

"Drive Golf", Very interesting new Flash Module!!! for GC2, available at https://golfsimulatorforum.com/forum/golf-simulator-forum/golf-simulators/205072-very-interesting-new-flash-module-for-gc2#post205270, May 7, 2019, 4 pages.

"Wbond", What Triggers the GC2, available at https://golfsimulatorforum.com/forum/foresight-sports/265933-what-triggers-the-gc2, Apr. 29, 2020, 5 pages.

Bravo Golf, Online Virtual Screen Golf Game, available at https://bravogolfsimulator.com/en/bravogolf/Software.jsp, at least as early as Jan. 27, 2024, 6 pages.

"Utkarsh1148", Golf_Trail, available at https://github.com/utkarsh1148/Golf-Trail, at least as early as Jan. 31, 2024, 5 pages, plus referenced source code.

Leary, Matthew et al., Screen prints of discussions on "opensource-lm" Discord Channel in GSPro Country Club Server, available at https://discord.com/channels/921253750134423562/929567130742038558, at least as early Jan. 31, 2024, 53 pages.

* cited by examiner

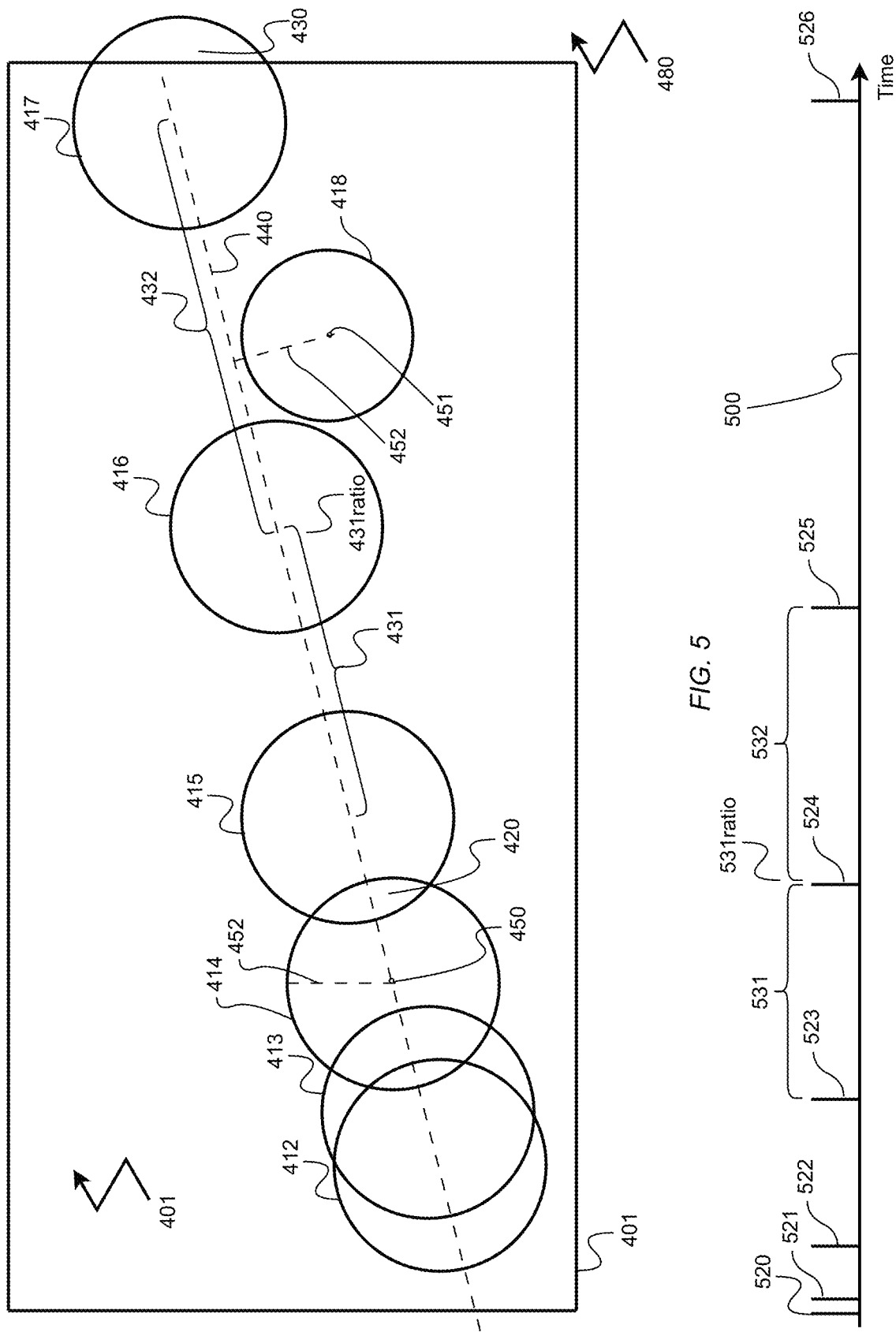

TIMING DETERMINATION IN CAMERA-BASED MOTION MEASUREMENT SYSTEMS

FIELD

This disclosure relates generally to systems and methods of analyzing the motion of objects, and more specifically to the determination of timing in camera-based and sensor-based motion measurement systems. Such systems may be used for purposes including determining the position, orientation, and velocity paths of objects in motion.

BACKGROUND

Measurement and simulation systems track and analyze objects that move at varying speeds. For example, golf, soccer, and baseball systems deal with balls that may move as slowly as one meter per second to upwards of 90 meters per second or more. As another example, autonomous vehicles may track objects moving outside the vehicle at even faster relative speeds. The system may not know or be able to predict what speed(s) will be present at any given time. Working correctly at all objects speeds can present challenges for these systems.

One approach to tracking moving objects having varying speeds is to use cameras or other sensors that have fast shutter times and/or high effective frame rates. Fast shutter times reduce blur for fast moving objects, and high frame rates (e.g., pictures/frames per second) can capture successive images of these objects for analysis such that the image exposures are in close proximity to other exposures. Fast frame rates can also assist in capturing multiple images before the object(s) go out of the frame of the camera. Slower moving objects can also be analyzed using such equipment by examining image frames that are captured further apart in time.

One problem with high frame rate cameras, however, is that they are expensive and can require significant resources (such as computing equipment) to transfer, store, and process the resulting image data. An alternative is to use less expensive cameras with slower frame rates in conjunction with pulsing an illumination source for short pulses at a known, constant, high frequency, such as strobe lights. This alternative briefly illuminates the object of interest at different moments in time while the camera's shutter is kept open. This approach results in multiple exposures of the object that show up in the one captured picture. Analogous multi-exposure approaches also exist for non-camera sensors. Such high frequency strobe lights can effectively capture a fast-moving object image even if the camera does not support fast shutter and frame speeds. For example, U.S. Pat. No. 7,324,663 notes a "technique of multiple exposures to track the flight of the ball" where "the lenses are opened, and a flash strobe is used to create multiple exposures of the ball."

However, the '663 patent also describes certain challenges when using the multi-strobe approach. The "technique renders accurate analysis of ball motion difficult since multiple images are superimposed on top of each other." The patent also claims that "such a system cannot measure azimuth," and that "[s]peed, spin and launch angle are calculated in two dimensions introducing significant errors into the measured flight characteristics."

In fact, the superimposition of multiple exposures on top of one another occurs when a relatively high strobe frequency is used with slower moving objects. When an object is strobed so slowly that the object has not moved sufficiently in the time interval between the strobes, the second object exposure or imprint may show up at least partially in the same place within the picture as the first. This causes overlap that may impair the ability to discern the position or image of the object.

Using a slower strobe rate (with longer intervals between pulses) may avoid this problem for slow speed objects by giving the object more time to move away from its prior position. However, if it turns out that the object was instead moving quickly, it may move out of the camera's field of view before subsequent strobes are able to capture enough of the object's imprints (exposures). Problematically, multiple imprints may be required for accurate analysis. In addition, slower strobe frequencies may (for higher object speeds) cause the imprints to be positioned far apart in the picture, which can present problems for certain types of analyses. For example, spin analysis for quickly spinning objects such as golf balls may require adjacent imprints that are imaged in close physical proximity to each other to ensure the ball does not spin more than the system is capable of discerning between the two imprints.

SUMMARY

In certain embodiments of the present system, an illumination system is repeatedly pulsed 'on' between non-constant 'off'-time intervals in a particular pattern/sequence of such intervals and pulses. Early, shorter intervals between pulses illuminate exposures of fast-moving objects for one or more cameras before the objects move out of frame, while longer intervals later in the sequence are used to capture slower-moving objects without undue super-imposition of the exposures. Aspects of the present systems and methods allow for the extraction of exposures that are sufficiently far apart to enable further processing, along with extraction of associated timing information.

Characteristics of the pattern of the pulses and off-time intervals can be used to determine which pulses are correlated with which the exposures in the picture (e.g., which pulses illuminated which exposures). The correlation can then be used with the known timing of the pulses to determine the amount of time that passed between certain exposures. In so doing, the speed, spin rate, and other characteristics of the object in flight are derived. Comparisons of the position, size, and/or shape of the object image exposures can also be used to determine characteristics including the initial velocity and projected trajectory of the object.

In one embodiment, the present systems make use of the constant (or near constant) speed of the object through short distances to determine an association between the pulse intervals of the illumination and the distance intervals of the object's exposure images. Due to the constant speed of the object, the distance the object travels between any two illumination pulses is roughly proportional to the amount of time between those pulses. Using this relationship, the ratios of the distances between two pairs of object exposures can be correlated to the ratios of two pairs of corresponding strobe pulse intervals because the ratios should be very similar. Specifically, the ratios between the two distances travelled by the object as it is strobed at three points in time should be roughly equal to the ratios of the two time intervals between the three strobes.

The pulse intervals (the length of the off-time of the illuminations), as well the ratios of these intervals, are known a-priori. Certain embodiments then compute one or more of the ratios of the distances the object is perceived to move through from exposure to exposure. In embodiments, the ratios of adjacent pulse intervals are generally different than each other and/or may adhere to a particular sequence. The pulse intervals themselves may also be different from some or all other pulse intervals.

In some embodiments, the computed ratio of the distances between two adjacent pairs of object exposures (e.g., a total of three adjacent exposures) is compared to each of the known ratios of the timing between each adjacent pair of pulses. The pulse ratio that is closest to the distance ratio is determined to encompass the three pulses that correspond to the three object exposures being examined, forming a correlation. The known time intervals between those three pulses are then determined to be the respective times that passed between each of the two distances between the three object exposures. One or more distances-per-unit-time are calculated and then used as the speed of the object during the time its image was imprinted in the captured picture. The time may also be used to determine a spin-angle-per-unit-time for spin analysis or for other purposes.

In some embodiments, the object exposures undergo image processing to determine the spin speeds of the object in one or more dimensions/axes. The exposures may be filtered using image processing techniques to simplify the images and highlight certain features that are used for comparing the apparent orientation of the object (e.g., spin angles) in different exposures.

Embodiments of this disclosure discuss various operations performed in a method, system, and/or computer-readable medium. The operations may include capturing a plurality of exposures of an object wherein each exposure is illuminated at least in part by a respective illumination pulse in a plurality of pulses. The operations may further include determining a pulse ratio of: a first time interval between a first pair of illumination pulses, and a second time interval between a second, different pair of pulses, wherein the first and second time intervals differ from each other in length; and determining a distance ratio of: a first distance between objects in a first pair of exposures and a second distance between objects in a second, different pair of exposures. Additionally, the operations may include determining a correlation between the pulse ratio and the distance ratio; using the correlation to estimate a time between when two exposures in the plurality of exposures of the object were captured; and using the time estimate to determine at least one of the object's velocity, position, speed, trajectory, or spin. In some of these operations, the first pulse time interval is created by combining two or more pulse intervals into a virtual first pulse interval, the virtual interval comprising the sum of the two or more actual pulse intervals. In some of these operations, the determining a correlation comprises comparing the distance ratio to the pulse ratio. In some of these operations, the determined pulse ratio is different than other pulse ratios of other pulse time intervals in the plurality of pulses. In some of these operations, on average, the time intervals increase as between pairs of adjacent pulses that occur earlier in time and pairs of adjacent pulses that occur later. In some of these operations, at least one of the plurality of exposures selected for use in determining the correlation are selected by at least one of: comparing that object's distance to another object, comparing the color of the one object to another object, and comparing the position of the one object to a computed trajectory.

BRIEF DESCRIPTION OF FIGURES

Example embodiments will be described and explained with additional specificity and detail using the accompanying drawings in which:

FIG. 4 illustrates an example picture showing multiple exposures of a ball in flight;

FIG. 5 illustrates an example illumination pulse sequence;

DESCRIPTION OF EMBODIMENTS

The present systems are described more fully below with reference to the accompanying drawings, in which certain embodiments of the systems are shown. However, the present system may be embodied in many different forms and should not be construed as limited to the embodiments set forth here. Throughout this specification, like numbers refer to like elements.

Figure 1:
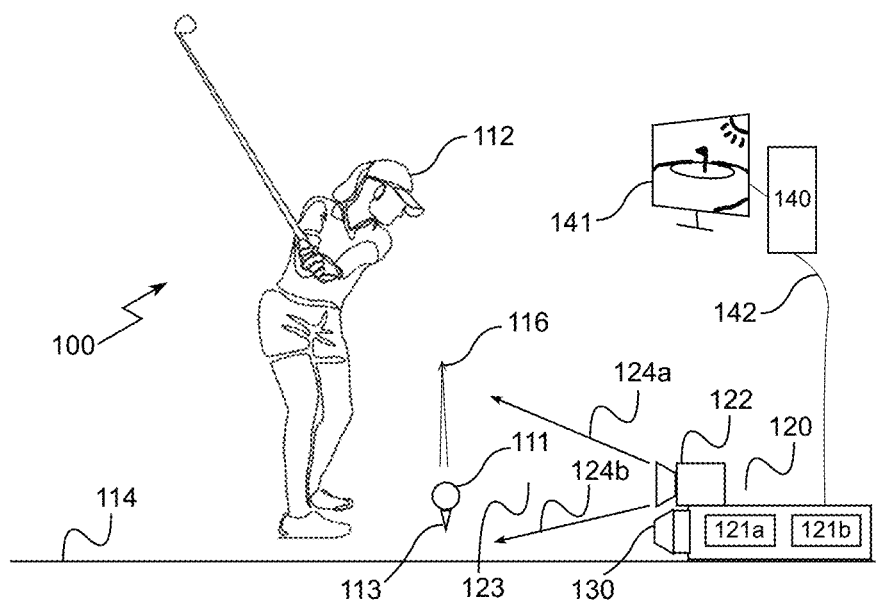
FIG. 1 illustrates an example environment in which the motion measuring and analysis embodiments of the present system may be used. The example is shown as viewed from behind a person using the system.

FIG. 1 illustrates an example environment 100 in which to measure and analyze a moving object 111 using embodiments of the system. The environment is arranged in accordance with at least some embodiments of the present disclosure. The object 111—which may initially be at rest—may be set in motion by an actor such as a sports participant, 112. Certain equipment may act to provide support for the object, such as golf tee 113, which is positioned with player 112 on a surface, 114.

When the example object is a golf ball, when hit by the player in the example, golf ball 111 would be expected to travel substantially in the positive z-axis direction (into the page) as denoted by direction marker 116. Ball 111 may also travel along other trajectories in the case of, for example, a left-handed player hitting the ball. In that latter case for the illustrated example, the ball would be coming substantially out of the page in the negative z-axis direction.

Example environments may be unrelated to sports. For example, an example environment could be a moving vehicle, on which the systems of this disclosure are mounted to monitor objects outside the vehicle. In such environments, the objects are moving relative to the vehicle, but may otherwise be stationary. The sensing components used in such environments can be different in some respects from the components used in, for example, sporting environments, but the techniques in this disclosure are still applicable.

As illustrated in FIG. 1, the environment can include an object monitor system 120 having one or more computing systems (121a and 121b in the illustrated example) coupled either directly or through a connector module to one or more cameras such as 122. The system may also comprise additional circuitry or hardware (not shown in FIG. 1) external to the previously-mentioned components for purposes such as signal isolation and logic-level translation. For example, Illumination source 130 may be coupled to system 121*a* via such circuitry.

Camera 122 has a field of view in which the camera can "see" object 111. Field of view 123 is approximately delineated in the vertical dimension with rays 124*a* and 124*b*. The camera's field of view also has a Z-axis direction (relative to FIG. 1), which is not shown but would be understood to span a separate, potentially different set of angles.

To assist the player/user 112 in understanding the results of using monitor 120, the system may also include an external computing device 140, and/or a display 141. Display 141 may be connected directly to device 140 or to monitor system 120. Device 140, as well as computing systems 121*a* and 121*b* may each respectively be, e.g., one or more workstations, desktop computers, laptops, cloud-computing interfaces and/or small single-board computers such as Raspberry Pies, or other types of computing devices. Computing device 140, and/or display 141 may be coupled to the other parts of the system using hardware (e.g., cabling 142) or through wireless communications systems. Device 140 and display 141 could comprise a personal communication device such as a mobile phone, or fixed devices such as an LCD screen, or a digital projector that projects images onto a wall or backstop or other types of displays. The system may include multiple such displays, including for viewing the operation of the system remotely. The term 'monitor system' as used in this disclosure can refer to the object monitor system 120 as well as to the larger system including other elements of FIG. 1.

Alternatively, components of the monitor system such as the camera(s) and illumination source(s) may be positioned differently than illustrated in FIG. 1. For example, the components may be placed in other positions and angles with respect to the initial position of the object, its trajectory, and/or any person that is interacting with the object. If the person is a soccer player kicking a ball as the object, the monitor might be placed directly behind the player. Monitor 120 might also be mounted on the ceiling above or to the side of environment 100. The exact geometric calculations will vary for different positions and angles, and may be different for a soccer player than for, e.g., a golfer. However, the same techniques and principles in this specification can still be used along with appropriate geometric translations to account for the orientation of the camera(s).

Figure 2:
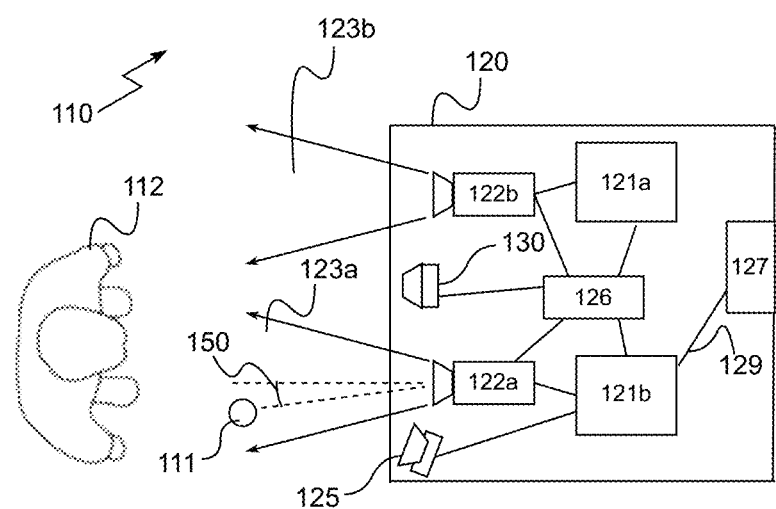
FIG. 2 illustrates another example environment in which the motion measuring and analysis embodiments of the present system may be used. The example is shown as viewed from above a person using the system.

FIG. 2 illustrates another perspective of an environment 100 in which the monitor system 120 may be used. FIG. 2 shows a top-down view of the environment of FIG. 1. The example monitor system 120 in FIG. 2 includes two cameras, 122*a* and 122*b* with respective fields of view 123*a* and 123*b*. The fields of view may differ because the position of the cameras differ. Object 111 exists at an angle 150 off the axis of the camera 122*a*. Angle 150 is shown in the X axis relative to the camera, and a separate angle (not shown) also exists in the Y direction (e.g., 123 in FIG. 1). Some embodiments position camera 122*b* so that its field of view can better see the object after it has moved some distance, e.g., moved away from the player and to the right of monitor system 120, looking the direction of the cameras. In FIG. 2, monitor 120 includes the same computing systems 121*a* and 121*b* shown in FIG. 1, as well as additional circuitry in the form of connection board 126 and circuitry and/or software comprising an external interface 127 for communicating with elements outside the monitor. The components of monitor 120 are shown as coupled together using communication channels such as channel 129. Also shown are other, similar (unlabeled) channels, which are illustrated as lines between components such as 121*a*, 121*b*, 122*a*, 123*b*, illumination source 130, sensor 125 and connection circuitry 126. Such channels could be wired or wireless connections and can exist in whatever configuration is appropriate for the components that comprise the monitor.

Cameras 122 (and any other cameras) each have at least a lens and a sensor. A camera could be, for example, a global shutter camera implemented in charge coupled device (CCD), complementary metal oxide semiconductor (CMOS), or other technologies. The camera has a shutter mechanism which may be mechanical but is typically implemented in hardware and firmware by manipulating the sensor and the reading of data from the sensor. In some embodiments, both cameras are "Pi Global Shutter" cameras. The lens could be a wide-angle lens capable of capturing the object of interest throughout a wide range of angles. In some embodiments, the lens is a 6 mm 3 MP Wide Angle Lens. The cameras can may be connected to computing systems 122*a* and/or 122*b* via a cable, for example using a multi-lane MIPI connector or a USB connector. If two cameras are used, they may be connected to two respective computing systems or both to the same computing system. The use of externally-triggered cameras (whose shutters open and close via an externally supplied signal) may be beneficial in terms of being able to quickly open and close the camera's shutter instead of using software-generated messaging. The cameras can be connected directly to the computing systems or via a signal module as part of circuitry 126. The signal module can also perform functions such as voltage level shifting and isolation, such as isolation between higher-voltage strobe switching and the typically lower-voltage computers.

At any place in this disclosure where cameras are used as examples, so to can other sensors be used in a similar manner. For example, combinations of Lidar (Light Detection and Ranging) emitters and sensors can be used as can other radar sensor systems.

Some objects such as golf balls may move in more than one direction (such as when hit by a left-handed versus a right-handed golfer). To assist with this, the mounting point for one or more cameras may be movable such as from one side of the monitor to another. A pivot can act to move the camera and potentially also the illumination source. The movement can also help accommodate very slow-moving objects, such as when a golf ball is putt a short distance. For slow objects, the second camera may be moved to be close to the first camera. The mounting hardware may communicate with the rest of the system to inform the system of the point's orientation.

Alternatively, the two cameras may be mounted substantially at the same distance from the starting point of the object. In this case, one camera can point to, e.g., the left of the monitor (looking down on the monitor). That camera positioning allows the object to be placed to the left of the monitor to provide additional time between the movement triggering when the motion begins and when the other, second, camera must begin to take pictures. The second camera could also be pointed to the right to provide additional time. The ball location calculations need to accommodate this alternative geometry, if used. The angling of the cameras may allow for a more compact, substantially vertical monitor configuration.

Illumination source 130 may be a strobe or flash light unit or other lighting system capable of producing short, bright bursts of light or other forms of illumination. In certain embodiments, the source may comprise a high wattage (50 W or more) array of infrared (IR) LED lights such as COB Integrated Matrix Light Beads. Source 130 may also include a lens to help focus the light the source emits. Source 130 may also comprise one or more lasers. The use of IR light, such as 850 nm light, can reduce the bloom and smear in images that could otherwise be increased due to the amount of lower-wavelength (visible) light in the operating environment. The use of IR lights may also reduce glare or flash that could be perceptible to humans who interact with the system. If the illumination source 130 produces IR light, the cameras are selected or configured to be sensitive to the IR wavelengths. The illumination source may also comprise, or work with, a switching circuit (not shown), such as a FET-based switch (e.g., an IRF520 MOSFET Driver Module). The switch allows logic-level signals, such as those in a strobe sequence generated by a TTL-level (e.g., 1.8v, 3.3v, or 5v) source, to switch a higher voltage/power signal (e.g., 12v) that drives the LEDs. The switching circuit can optionally be part of the circuitry 126 of monitor 120. To control the illumination source 130, a sequence of pulses is sent to the switching module that controls the on and off pulsing of the source. The pulse sequence may be created by dedicated hardware or by a combination of hardware and/or software. For example, the pulse sequence may be created by using software to "bit bang" communication hardware (such as an I2C or SPI bus) that would otherwise be used to send communication messages. The bit banging process creates a sequence of zeros and ones that are then sent out the communication channel at a relatively high baud rate. At sufficiently high baud rates, this technique can generate relatively short pulses of 10 uS or even shorter, and precisely control the "off" periods for the strobe sequence in a software-driven manner. The pulse sequences may be pre-generated and/or staged so that they may be sent as quickly as possible when the motion sensor is triggered. Sending the pulse sequence quickly can reduce the distance that a fast-moving object moves between the time of the trigger and the first capture of an exposure.

Computers 121*a* and 121*b* include internal and/or external memory systems. The memory may store internal representations of aspects of the physical and computing environments, including the 3D positions of the camera(s) or the graphical coordinates of captured exposures of the objects being measured. Embodiments may represent exposures internally by storing information associated with the exposures. The information may be in virtual units such as pixels, or in real-life units such as centimeters. The information can include the X, Y coordinate of the center, one or more radii, the average hue (including grayscale representations), and other information about the object.

Embodiments of the monitor system may also provide simulations and displays of the expected trajectory of the object under analysis. For example, the system could comprise a golf simulator that shows a simulated flight of the hit golf ball. The simulator can show the golf ball within a simulated or reproduction of a golf course, including a visualized trajectory of the ball within that course. Such simulators use the physics of ball flight in the air and travel on ground surfaces to allow a user to play a realistic game of golf without ever having to go to an actual golf course. Any one or more of the computing devices 121*a*, 121*b*, or 140, as well as external cloud or local computing resources may be used to create the simulation.

Monitor 120 may also include trigger sensor 125. Trigger sensor 125 senses when relevant object motion begins. Sensor 125 could sense a golf ball being hit by a club, a baseball hit by a bat, a soccer ball being kicked and so forth. The sensor can be a sound-based sensor that senses sounds associated with the beginning of object motion, an ultrasonic sensor, a radar/lidar sensor, a laser curtain, or a camera. In some embodiments, the sensor comprises a camera, which could be the same as camera 122*a* or 122*b*, or may be a separate camera. Regardless of its implementation, the sensor is coupled to one or more of the computer systems, the signal module, and/or to any of the cameras. For example, a sound-based sensor could be coupled through the signal module and ultimately to the external trigger input of a camera for that camera to quickly and immediately take a picture when the sensor is triggered.

In some embodiments, motion trigger sensor 125 is implemented using a camera. The sensor triggers when the object, such as a golf ball, first moves. The output (trigger) of the sensor can then be used to understand when to take additional pictures of the object, e.g., in flight.

Figure 3:
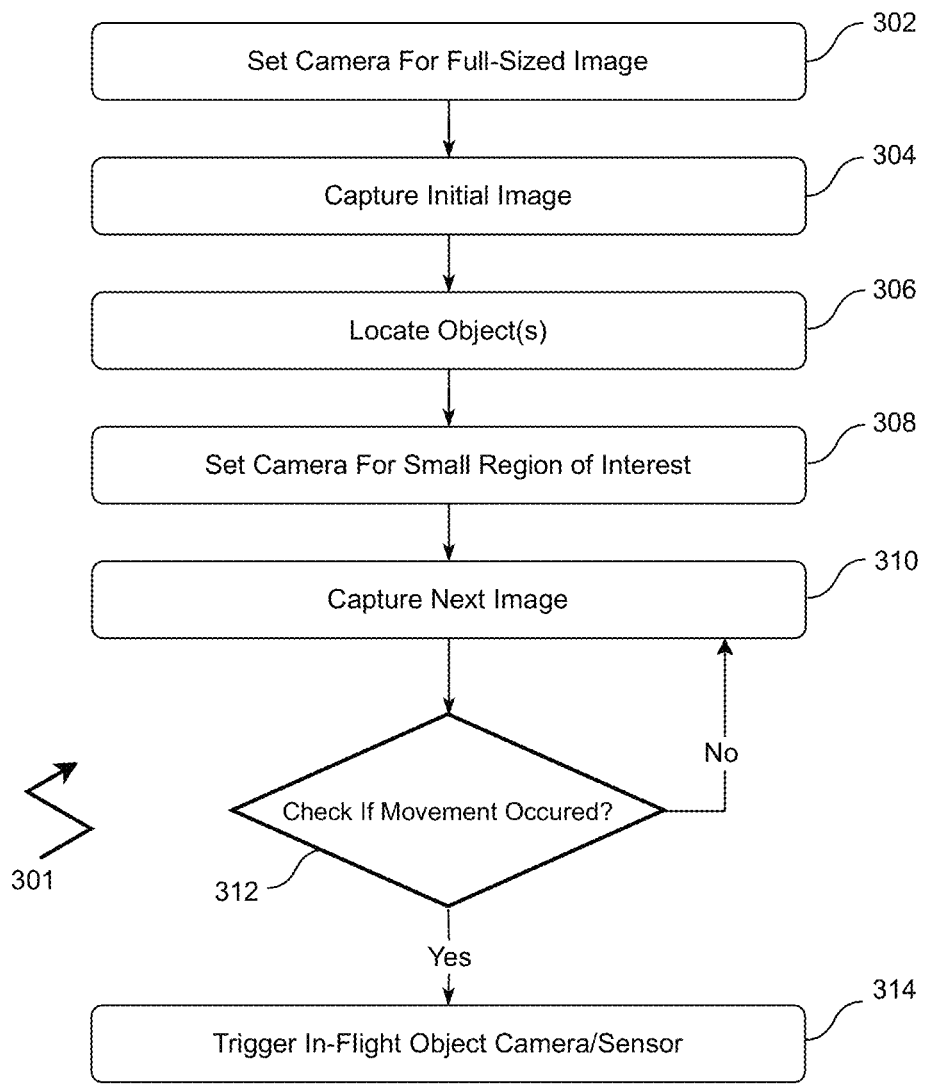
FIG. 3 illustrates an example block diagram depicting operations performed to use a camera as a motion sensor.

FIG. 3 illustrates an example algorithm 301 for use with camera-based motion sensors. In this example, the sensor may comprise a camera that has a relatively slow FPS rate when taking a full-size picture, but that can provide a higher rate (e.g., 250 FPS or greater) when taking a smaller "cropped" picture. Even if a camera-based movement sensor is not used, the system may capture an initial picture of the object to perform operations such as calibrating the initial object size, distance, orientation and/or other characteristics.

In Block 302, the camera is initially configured to take a full-sized (maximum resolution and field of view) picture after which the monitor system takes and uses the picture to locate the object in the view frame. Alternatively, one camera can be used for the initial picture, while a second, higher FPS camera or sensor is used to repeatedly monitor for movement.

In Block 304, the system takes a picture of the initial location of the object. The initial picture may be taken using ambient light (if sufficient), or using illumination source 130.

The initial picture may be taken of the full object using a non-reduced field of view. This picture can be used as described later to compare to other images of the ball to help determine the ball's orientation, spin, trajectory, or other characteristics. If the resolution of the camera being used as the motion trigger sensor is higher than the camera in use for taking later pictures of the object, the earlier picture may allow for a more precise determination of characteristics by using the higher-resolution image to compare to one or more lower-resolution images.

In Block 306, the object is located within the view frame and (optionally) in real coordinates within the environment. The location process may use the same object identification process (e.g., a Hough detector) used to later identify object exposures in a multi-exposure image as described below for FIG. 7. The location process can limit its search for objects to a predetermined area in the environment, such as an area in which a ball is expected to be placed to make a shot. A range of to-be-identified object sizes may also assist in making the identification process more accurate.

Once the object is identified, if the object has a known size, such as a regulation baseball, golf ball, or soccer ball, the known size can be used to calibrate aspects of the system. For example, using the known size of a golf ball and the perceived radius of the located ball (e.g., in pixel units), along with a known focal length of the camera, the distance of the object from the ball can be determined for use in later calculations. Alternatively, the effective focal length of the camera can be determined based on the perceived radius if the ball is required to be set at a specific location from a camera. A specific location can be designated by, for example, a laser point or other targeted light source.

When making measurements based on images captured from cameras, such as determining a focal length of object size, the camera system may need to be calibrated and/or undistorted. Doing so can correct for problems like image distortions caused by a camera lens. A combination of a known-sized object, such as a checker board pattern, along with software calibration functions is typically used. Such functions include cv::initUndistortRectifyMap( ) and cv::remap( ) in the OpenCV (Open Source Computer Vision Library) software framework. Such calibrations can be used prior to any of the image-based measurement techniques in the present disclosure.

While an additional camera can be used to stereoscopically locate the object in space, a less expensive alternative used in some embodiments uses only a single camera with a known focal length and field of view angles along with the known size of the ball. For example, a single camera can use geometric trigonometric techniques along with the focal length and object size to determine the distance from the camera to the ball. Using that information and the distance of the object from the center of the view frame, all three X, Y, and Z distances, as well as azimuth and side angles, may be computed.

In Block 308, a much smaller area on the screen is determined by, for example, positioning a rectangle of interest within the area of the screen where a golf ball is found. Using this smaller region of interest, the monitor configures the camera to be cropped to only the rectangle, which may comprise very small visual area, such as less than 100×100 pixels. By limiting the field of view of the camera in this way, the camera may be able to achieve higher frame rates because less pixel data must be transmitted and processed.

In Block 310, the camera begins a process of repeated, rapid, picture-taking of the region of interest to use for comparison against a later image. If the illumination source is not used to provide supplemental light, the sensitivity of the camera may have to be adjusted to provide adequately bright pictures at the higher FPS speed.

Next, in Block 312, the camera repeatedly compares pictures of the region of interest, where after each iteration, a more recent picture is compared to an earlier picture to determine whether the object has moved. If enough pixels in the region of interest have changed by a sufficient amount (e.g., in their color/illumination/grey-scale value, etc.) compared to the initial or otherwise-prior image, the monitor considers the object to have moved. The picture-taking process and the comparison process may be performed in parallel, including by using a processing pipeline.

In Block 314, the system has determined that the object has moved. At that point, the process of taking a sequence of exposure images of the object in motion is triggered to start. The sequence of exposure images may be taken by a separate camera, such as 121b in FIG. 2. Minimizing the amount of time between recognizing object movement and the triggering of the later exposure images can allow the system to work with higher speed objects.

Due to delays in the components of the system such as the camera(s), processing software, hardware triggering lags, etc., a fast-moving object may move too far before the camera(s) can capture an image (or some minimum number of images) of the object. To reduce or eliminate the problem, a second camera (e.g., 121b) may be placed on a mounting point at some distance away from the first camera (or other sensor) that is acting as a motion trigger. The distance allows for a picture to be taken later in time than might otherwise be possible while still capturing the object exposures in the camera/sensor's field of view.

Advantageously, the use of the present system's variable-interval strobe embodiments can allow the system to determine which strobe flashes (and the timing of those flashes) correspond to which image exposures captured by the second camera. This advantage exists even if the second camera's field of view does not include the initial position of the object and cannot track the object's flight from that initial position.

FIG. 4 illustrates an annotated representation of a picture of exposures of a ball captured by camera 121b in an example golfing simulation environment using embodiments of the present system. The exposures are captured after the detection of the object beginning to move, as illustrated in, e.g., FIG. 4. In the golf simulation application, the objects that the present systsem measures and analyzes are golf balls and/or graphical representations of such balls. The ball exposures shown in FIG. 4 are simplified representations that do not show features such as the dimples in the golf balls that the camera would also see. The embodiments that are described later in this specification refer to these representations to explain the embodiments' operation.

Embodiments can create images such as those depicted in FIG. 4 by opening the shutter of one or more cameras, turning the illumination source on for short periods at varying intervals of time (as illustrated in FIG. 5), and then closing the shutter. Depending on the length of time that the camera shutter is open, a smear (aka a bloom) may also be visible in the image (not shown in FIG. 4). Smears may be caused by stationary objects that reflect the illumination and/or ambient light throughout the picture exposure time and/or by the moving object itself as it reflects light to the camera as the object moves through the field of view. The intensity of the illumination source is chosen to be bright enough to highlight the object in sufficient contrast versus any smear while also accommodating the relatively short amounts of time during which the source is turned on.

In FIG. 4, each of visible exposures 412 thru 417 (418 is addressed further below) of a ball in flight is shown along a possible ball trajectory 440. The ball travels from left to right in the figure, but could also have travelled from right to left or along other trajectories in the case of, for example, a left-handed player hitting the ball.

FIG. 4 depicts a single image with a viewable area (401) that the camera can see. There are also represented physical areas outside 401 that the camera may not be able to see such as area 480 and portions of object exposures such as 430. Although FIG. 4 shows only a single image with multiple object exposures, the present disclosure is equally applicable to situations in which the system processes multiple, separate captured images, each with one or more exposures depending on the number of strobe flashes per image.

Except for the left-most and right-most end balls (412 and 417, respectively), each ball exposure has associated distances to two other balls. The end exposures have only a single distance to the adjacent ball exposure. Example distances are shown in FIG. 4 as 431 and 432. Embodiments of the measurement system may calculate and store ratios of certain pairs of the exposure distances. For example, for the three ball exposures 415, 416 and 417, there can be considered a single distance ratio formed by the ratio of distance intervals (e.g., interval 432 divided by interval 431), represented in FIG. 2 as 431 ratio.

Each exposure in the example of FIG. 4 has a center point defined by an (X, Y) coordinate/pixel (e.g., 450 and 451) in the viewport of the camera, where the X-axis extends in the positive to the right, and the Y direction extends in the positive going up the page. Each exposure also has at least one radius such as example 452. When such exposures are represented and/or captured by a camera, they may also may also appear (or be represented digitally) as ellipses or other shapes. Circular balls may appear as ellipses in images depending on which lens(es) are used with the camera and the distance of the ball from the center of the frame. In some embodiments, these ellipses may be represented and processed by the system as having two radii, each orthogonal to the other. In some embodiments, the plural radii are used, separately or together for the same purposes as the single, circle-based radii.

Due to the differing times at which the object exposures are captured relative to the speed of the object, some exposures may be overlapped such as exposures shown in FIG. 4 as 414 and 415. The overlap area, 420 may be small enough not to affect processing. But, if large enough, the overlap may prevent accurate identification of the object, its position, and/or its size. The overlap may also smear the related part of the image such that identification of certain object surface features, such as used for spin, may be impaired.

A trajectory 440 can be represented by a virtual line or curve through or near two or more of the center points such as points 450 and 451. A linear or curvilinear distance from an exposure to the trajectory may also be calculated and stored for each of the object exposures. For example, the distance from the center of the exposure to the trajectory along a line orthogonal to the trajectory line is shown in FIG. 4 as line 452. Representations of the ball trajectory can be made by various techniques such as curve fitting or line approximations.

Non-visible exposures potentially exist outside field of view 401. For example, an illumination pulse (not shown) may have occurred prior to the pulse that illuminated exposure 412. In that case, the earlier pulse would have illuminated the ball when it was to the left of exposure 412, and potentially prior to the ball being visible within field of view 401. In a similar manner, non-visible exposures potentially exist to the right of field of view. These exposures are formed by pulses that occur after the pulse that illuminated visible exposure 417.

FIG. 5 illustrates examples of a pulse sequence for use in embodiments of the system. Like the other figures in this disclosure, FIG.5 is not to scale. Timeline 500 represents the passage of time from left to right. Pulse interval marks, e.g., 520 to 526 represent short periods in time when the illumination source 130 is on. The inter-pulse (aka inter-strobe) periods when the illumination source is off are shown as, e.g., pulse intervals 531 and 532.

Although some of the pulses in FIG. 5 substantially line up horizontally with the centers of the exposures in FIG. 4, the horizontal scales in the respective figures are of different units. FIG. 4 represents distance horizontally (on the X axis), while FIG. 5 represents time in the horizontal dimension.

The exact period of time during which the illumination source is on is not shown in FIG. 5, as that time is generally on the order of microseconds (us) when analyzing fast-moving objects, while the time between illuminations (the pulse intervals while the illumination is off) is generally on the order of milliseconds (ms). For example, the on-pulse length for each pulse may be 20 uS, while the pulse intervals (when the illumination source is off) could be, in the example of FIG. 5, intervals of 0.5, 2.0, 6.0, 12.0, 15.0, and 40.0 ms.

Having a very short first interval can help ensure that at least two exposures are captured even for very fast objects. Longer intervals that occur later in the sequence can resolve exposures for slower-moving objects without excessive overlap. Longer intervals can also provide time for slower moving objects to move into the field of view of the camera(s) if the cameras are positioned at a distance from the initial point of the object. Longer on-pulse lengths may be appropriate for systems with relatively slow-moving balls (e.g., 10 m/s), while shorter lengths such as 10 uS may be appropriate for fast (e.g., 90 m/s) objects. Generally, the shorter the on times, the more intense the illumination required.

Still referring to FIG. 5, embodiments of the measurement system may calculate and store ratios of certain pairs of the illumination pulse intervals. For example, for the three pulses 523, 524, and 525, there can be considered a single pulse interval ratio (or 'pulse ratio') formed by the ratio of pulse intervals (e.g., interval 532 divided by interval 531), represented in FIG. 5 as 531 ratio.

By increasing (at least generally, on average) the length of the intervals as time progresses, the embodiments of the present system can accommodate capturing non-overlapping object exposures across relatively wide ranges of object speeds. The specific selection of pulse intervals may depend on various factors and are often determined empirically. Factors include the range of object speeds, the camera or sensor(s) fields of view, the potential length of time the object takes to enter that field and to traverse and exit it, the number of exposures/images that are to be captured, and the desired grouping or proximity of adjacent exposures.

Illumination pulses can and often do also occur before or after the period during which the object is visible within the field of view 401 in FIG. 4. This condition will depend on when the pulses begin and where the camera is positioned relative to the motion of the object being analyzed. So too can potential illuminated exposures of the object being analyzed have occurred within the spaces both to the left and the right of view port 401. In some cases, the system may still be able to recognize the object even if the object is partially outside the field of view such as exposure 417.

Object Timing Correlation

Embodiments of the present system can determine which illumination pulses correspond to (are correlated with) which object image exposures. Embodiments can even overcome situations where (e.g., due to real world limitations in image noise, resolution, extraneous objects, and light) certain of the images and exposures may not be usable or may be missed entirely (e.g., not identified) during processing of the image. For example, for slower-moving objects, exposures can be missed or become indistinguishable because the initial, fast, pulses (which are configured to capture high speed objects and thus happen very quickly) are likely to create high levels of overlap between the captured exposures. The overlap occurs because the object will have moved only a small amount between the pulses. In fact, for all but the fastest objects, the first few exposures are likely to overlap entirely such that each is indistinguishable from the others.

The concept of 'pulse collapsing,' discussed further below, can work to accommodate the missing exposures by recreating a 'virtual' pulse sequence that is more likely to be highly correlated to the remaining set of exposures than the original pulse interval sequence. Less complicated examples without interval collapsing are discussed first, followed by examples that collapse two or more pulse intervals to accommodate missing exposures.

Figure 6:
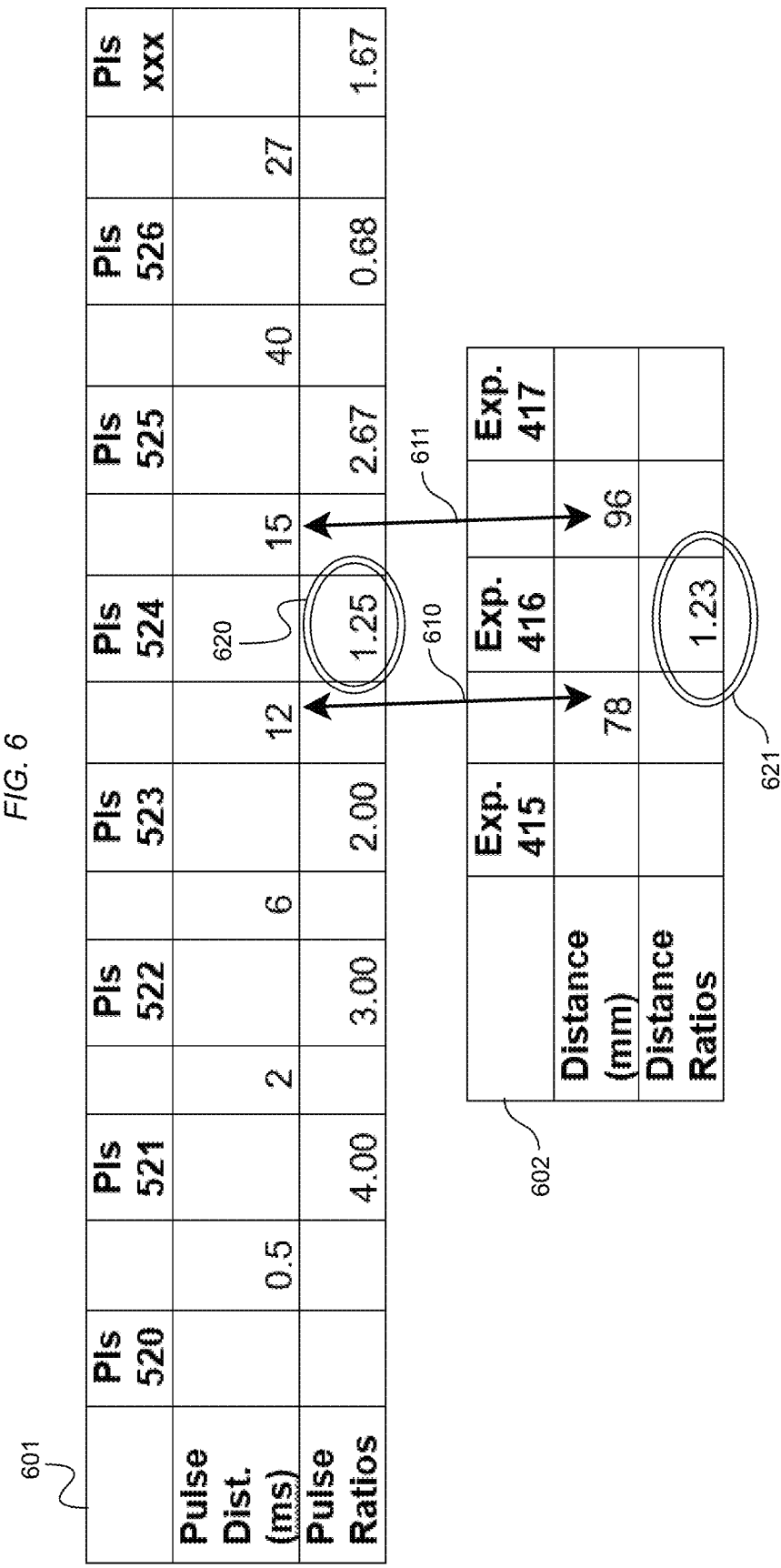
FIG. 6 illustrates an example set of tables of pulse intervals and exposure distances related to a measurement system.

FIG. 6 illustrates an example set of tables of pulse intervals 601 and exposure distances 602. The exposure distances can be calculated by any number of techniques. For example, the distances can be derived from trigonometric principles using the known focal length of the camera and calculated distance(s) to, e.g., the object from the center of the image, to determine the X and Y distances between the real-world positions of the objects captured by the system as exposures. The distances are generally a straight-line distance (in the X & Y dimensions) between the centers of two exposures but could also include distance in all three dimensions. In the example of FIG. 6, only a subset of a larger group of exposures are used to correlate with the illumination pulses, specifically exposures 523, 524 and 525. The selection (and potential paring down) of exposures for use is described in additional detail for FIG. 7, but generally may be dependent on factors such as the quality, confidence, size, and position of each of the candidate exposure images.

In embodiments of the present system, the pulse intervals such as those in FIG. 5 have been selected so that each pulse interval ratio is generally different from the other interval ratios. This selection aids in determining the pulse/exposure correlation in some embodiments, but is not necessary. For example, pulse ratios that are not all unique are still potentially useful, especially when the sequence has a strong ability to auto-correlate with itself, and thus with the distance ratios. The present system enables the use of various numeric sequences and techniques in other disciplines to be used to enhance the correlation ability.

In FIG. 6, Table 601 illustrates an example pulse sequence and derived values including interval ratios. The time between pulses is shown in units of milliseconds (ms). The intervals are representative of the intervals shown in FIG. 4, and the pulses are representative of the pulses shown in FIG. 5.

Table 602 illustrates object exposure distances and ratios. The distances between exposures are shown in units of millimeters (mm). The data shown in the tables of FIG. 6 is roughly modeled upon the exposures and pulses shown in FIGS. 4 and 5, and particularly with distances 431 and 432 and pulse intervals 531 and 532.

Embodiments of the present systems use data such as the example of FIG. 6 to correlate the pulses and object exposures. In one embodiment, the present systems utilize the constant (or near constant) speed of the object (at least through short distances/times) to determine an association between the pulse intervals and the distance intervals of the object's exposure images. That constant speed results in the exposure distances being roughly proportional to the intervals between the pulses that illuminated each respective exposure. For that reason, the ratios of the distances and pulse intervals will generally be very closely matched when the pulse intervals are well-correlated to the exposure distances. A derived pseudo-constant set of distances that account for factors such as known aerodynamic drag or (de)accelerations of the system through space may also be used even if the object's speed is not constant.

Still referring to FIG. 6, in embodiments, a single distance ratio is compared to each of the set of pulse interval ratios to see which one is numerically closest. The comparison may be made directly or through techniques such as squaring the difference between each distance/pulse ratio to emphasize larger distances. In the example related to FIG. 6, the distance ratio 621 between distances 431 and 432 in FIG. 4 (and exposures 415, 416, and 417) is found to be closest to the ratio 620 of pulse intervals 531 and 532 in FIG. 5. The system then concludes that the 78 mm distance in distance table 602 is most likely correlated with the 12 ms pulse interval (as shown by relationship 610) between pulses 523 and 524, given that the associated respective pulse 620 and distance ratio 621 are nearly equal. Similarly, the system concludes that the 96 mm distance is most likely correlated with the 15 ms pulse interval (as shown by relationship 611). Further, pulse 523 is found by the system to be correlated to (e.g., caused the illumination of) exposure 415, pulse 524 is correlated to exposure 416, and pulse 525 is correlated to exposure 417. The basis for this correlation is that the correlated exposures and intervals are the values forming the ratios found to be most similar as between Table 601 and 602.

Using the correlation just derived in the example of FIG. 6, the speed of the object can be calculated. The time between pulses 523 and 524 is known to be 12 ms (per Table 601 in FIG. 6) and similarly 524 and 525 have a known time difference of 15 ms. The distance between exposures 415 and 416 is 78 mm, and the distance between exposures 416 and 417 is 96 mm.

Thus, the two respective speed estimates are 0.078m/0.012=6.5 m/s and 6.4 m/s. In other words, one or more of the pulse intervals can each be matched to a respective distance interval between the object exposures. This matching results in a correlation of the pulse sequence to at least part of the sequence of object image exposures.

Depending on the type of object and its speed, the object may actually slow down due to friction, gravity, or other forces even as it traverses the camera's field of view. In such cases, the slow-down can be effectively made up for by calculating the distance ratios using a value for one or both of the distances (or pulse intervals) that comprise the various ratios in a manner that accounts for the slow down. In the prior example, for instance, the distance between exposures 416 and 417 can be increased by a small amount (e.g., 1%) before calculating the now-larger ratio. The speed may also be estimated using the adjusted distance figure. By adjusting the data in this manner, the matches between distance and pulse ratios (such as 620 and 621 in FIG. 6) are made closer.

If more than three exposures of sufficient quality are available for use, the system can calculate multiple distance ratios. The multiple distance ratios can then be compared to the pulse intervals so that a potentially more accurate correlation can be determined. For example, two adjacent distance ratios can be compared to each available pair of adjacent pulse interval ratios. Doing so can increase the chances of determining the correct correlation even if some of the pulse intervals or ratios are numerically close to others.

Real-world implementations of the machine vision systems of this disclosure may have inherent challenges such as overlap of certain exposures, limitations in image processing techniques, image smear as well as various imprecisions and other suboptimal characteristics. Due to these challenges, it is possible that the system will 'miss' or fail to identify one or more of the exposures of the object. This can frequently occur when two exposures occur before the object has a chance to move at least one object's width from its position in the earlier exposure, resulting in overlap. For example, if the system failed to identify the overlapped exposures 413 and 414 in FIG. 4, the perceived distance intervals could be misleading. A ratio between the distances of the remaining exposures 412 to 415 and 415 and 416 would likely result in a value that does not correlate well to any of the individual pulse ratios. The distances between exposures 412, 413, 414 and 415 would effectively be subsumed into a single distance between 412 to 415.

To account for this potential problem, the correlation process in some embodiments performs pulse interval 'collapsing' by combining various (e.g., adjacent) pairs or triplets (or larger groupings) of pulse intervals into a virtual collapsed pulse interval. The collapsed interval can be used to accommodate for the missing exposures by making the pulse sequence appear as though there were only pulses corresponding to the available exposures. Then, the correlation determination process can be performed as it is for the non-collapsed original interval.

Some embodiments may determine object exposure timing using only the distance deltas and not rely on pulse interval information. For example, the distance deltas and/or ratios may be compared to a particular code or sequence that exhibits certain relationships between the distance deltas and/or ratios. Alternatively, curve-fitting may be used to compare the deltas/ratios to an expected function or numerical sequence.

The trajectory of the object can be derived in part with use of the stationary object image that was captured prior to the motion sensor being triggered. This technique can allow for measurements and calculations to be made over a longer distance of computed ball travel, which in turn may increase the accuracy of determining, for example, the launch angles of the object from the object's initial position.

Exposure Selection

Embodiments of the exposure selection process work to reduce the possibility of performing correlation calculations using inappropriate or incorrect exposures and/or exposure distances and sizes. These embodiments also allow for the selection and use of objects that are sufficiently far apart to increase accuracy for characteristics such as velocity and trajectory, and of objects that are closer for characteristics such as spin rates. Images near the edges of the camera field of view that could be subject to larger distortions than those in the center may also be avoided.

Figure 7:
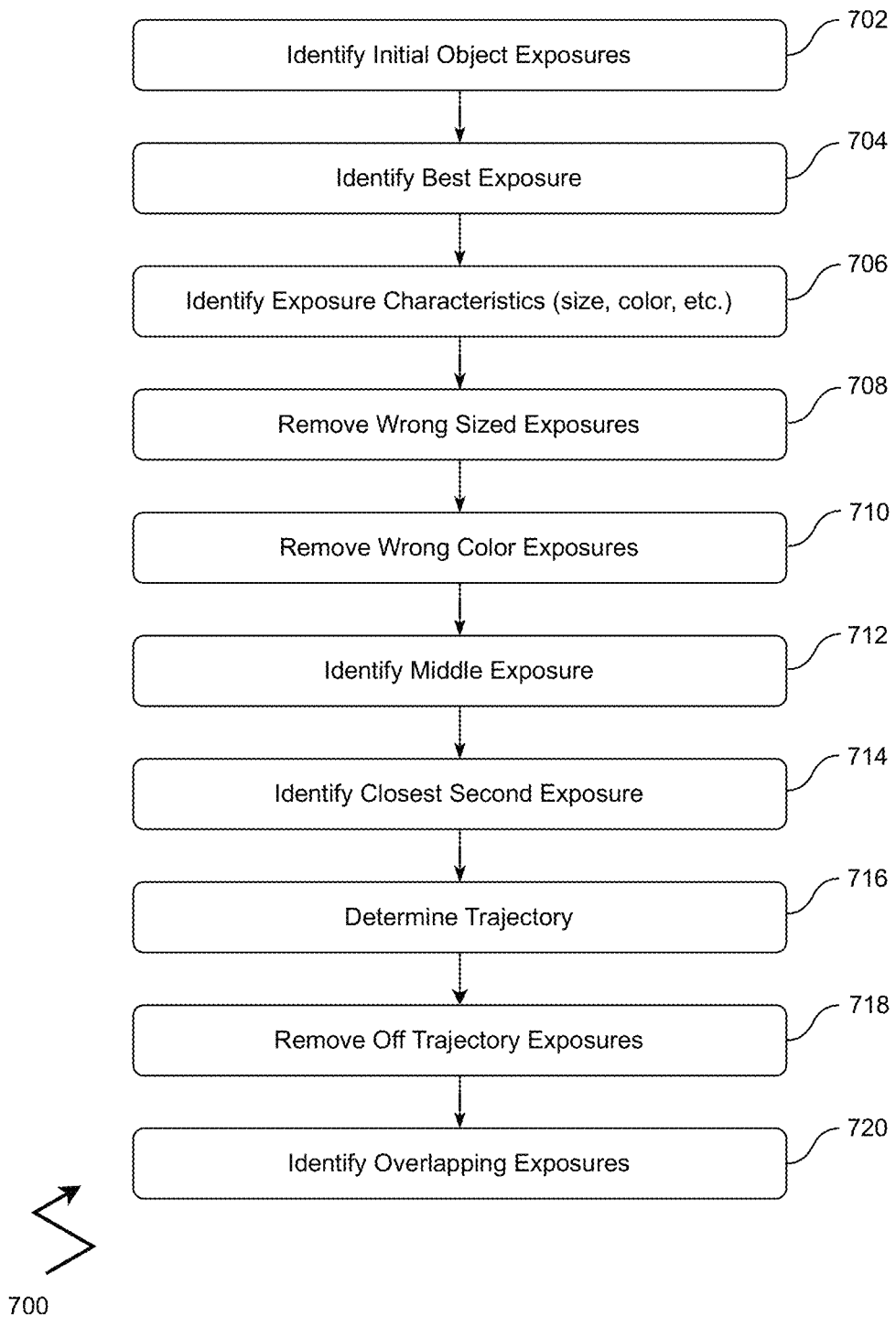
FIG. 7 is a block diagram depicting operations performed to identify and select object exposures according to certain embodiments of the present system.

FIG. 7 is a flowchart 700 depicting operations that identify and select object exposures according to certain embodiments of the present system. In the depicted method, an initial set of object exposures is identified using known characteristics of the object under analysis. The operations may be performed on any computing device that is coupled to the system, such as devices 121a, 121b, or 140.

At Block 702, a picture having multiple object exposures (such as the exposures shown in FIG. 4), is analyzed to identify the position and other characteristics of the object exposures. For the example of using balls as the objects, the system could use shape identification algorithms to determine the 2D or 3D locations of the balls. For example, a Hough circle detector or other circle or ellipse detector identifies the X, Y, and potentially Z coordinates of each part of the picture that appears to be a ball exposure. The z distance can be calculated using, for example, the changes in radius of the object or another dimension as the object moves nearer or further from the camera. The detector may be configured to identify not only stand-alone ball exposures such as element 415 in FIG. 4, but also each of multiple overlapping exposures such as 412, 413 and 414, or exposures that are only partially within the camera's field of view such as 417.

At Block 704, from among the identified exposures, a 'best' exposure is identified. The identification can be made by sorting quality scores resulting from the identification algorithm, such as the Hough algorithm or using other metrics. The identification can also be made from a blended set of metrics, each characterizing some quality of the respective exposures. The identification may include the use of morphological operations such as multiple dilations and erosions and opening and closing operations as well as edge softening techniques such as Gaussian blurring. Such techniques may be applied at any point during the image processing operations that are included in this disclosure In some embodiments, at Block 706, certain characteristics are identified. The characteristics are identified for the 'best' exposure and possibly for others. Characteristics include the relative or absolute size of the object, a color or hue or grayscale color or color-like metric, and quality metrics (such as how close the identified object is to the shape of the expected circle, ellipse, square or other shaped object). These characteristics are expected to be closer to the correct values for the 'best' exposure.

At Block 708, exposures that are have sizes that are outside of the determined expected size determined in Block 706 by some amount are removed from the exposures to be considered in the correlation processing. Wrong-sized exposures may be indicative of mis-identification of the objects. Mis-identification of objects may be likely. For example, to find ball-shaped objects in an image despite overlaps and/or imperfect circle shapes, a Hough or other identification algorithm may be configured to allow for numerous lower-quality circles to be found. This configuration may increase the chances of false positives. Thus, filtering out circles that have poor characteristics compared to the expected or 'best' object can make up for the relaxed configuration of the identification process.

At Block 710, exposures whose pixel values/color(s) are deemed inconsistent with the object to be found are removed from the exposures that are to be considered for later correlation with the illumination pulse sequence. For IR or gray-scale images, the "color" may not be a typical RGB color, but instead a gray-scale value or a brightness. Generally, objects whose pixel values are unlike the expected object's values are removed. The expected values may be derived from characteristics that are known a-priori, or from the 'best' exposure (described above), which is used as an archetype. A representative color for each exposure can be found by averaging a portion of the exposure's pixels or by otherwise determining a representative set of pixels.

At Block 712, the exposure (which may or may not be the exposure deemed the 'best') that is closest to the middle of the camera/sensor's viewport is identified, such as exposure 415 in FIG. 4. For at least some cameras/sensors, the middle-most exposure may be the least distorted and potentially the most useful exposure for determining certain characteristics such as object size and for imaging the object's surface.

At Block 714, the exposure that is closest to the middle-most exposure is identified, such as exposure 416 in FIG. 4. When determining object characteristics that require exposures in close time/distance proximity (such as spin determination), the combination of the middle-most and its nearest neighbor is a likely candidate pair for use, as is the closest non-overlapping pair.

At Block 716, an overall trajectory (at least within the view frame) for the object is determined. The trajectory can be calculated by computing a line that runs through the middle-most exposure and its nearest neighbor, by curve fitting through the determined centers of multiple exposures, or by other means.

At Block 718, the determined trajectory is used to compute a distance between that trajectory and the center of each exposure. Exposures such as 418 in FIG. 4 (if not already removed for being unlikely in size) may be removed from correlation consideration. The distance is typically measured along a line at a right angle to the trajectory that intersects the center point of the exposure.

At Block 720, exposures that overlap other exposures are identified and either segregated or removed from consideration. The extent of the overlap can be determined by assessing the distance between the centers of pairs of exposures relative to their respective radii. For example, exposures such as 412 and 413 in FIG. 4 may be identified as having a large amount of overlap because the distance between the object centers is much less than the sum of the respective radii. Such exposures may still be useful for determining data such as object location, movement, and speed, but less useful for processing that requires a clear view of many of the surface features of the objects, such as of dimples on a golf ball when performing spin analysis. Small amounts of overlap, however, may still be useful for surface-image processing, such as the overlap 420 between exposures 414 and 415 in FIG. 4. In FIG. 7, Blocks 702 to 720 may be performed in different orders than shown in FIG. 7, and not all of the steps need be performed.

Although not required, the monitor system may also use additional environmental data as well as interface(s) for the processing described in this disclosure. For example, for a monitor system in a simulated golfing environment, the additional data could include the right/left-handedness of the player, information about which club is being used by the player, hitting abilities, desired distance to be hit, the color(s) of the object being monitored and so forth. For example, the club selected by a golfer in a golf simulation could inform the pulse sequence timing with faster timing for clubs that are likely to hit the ball at a higher speed.

Figure 8:
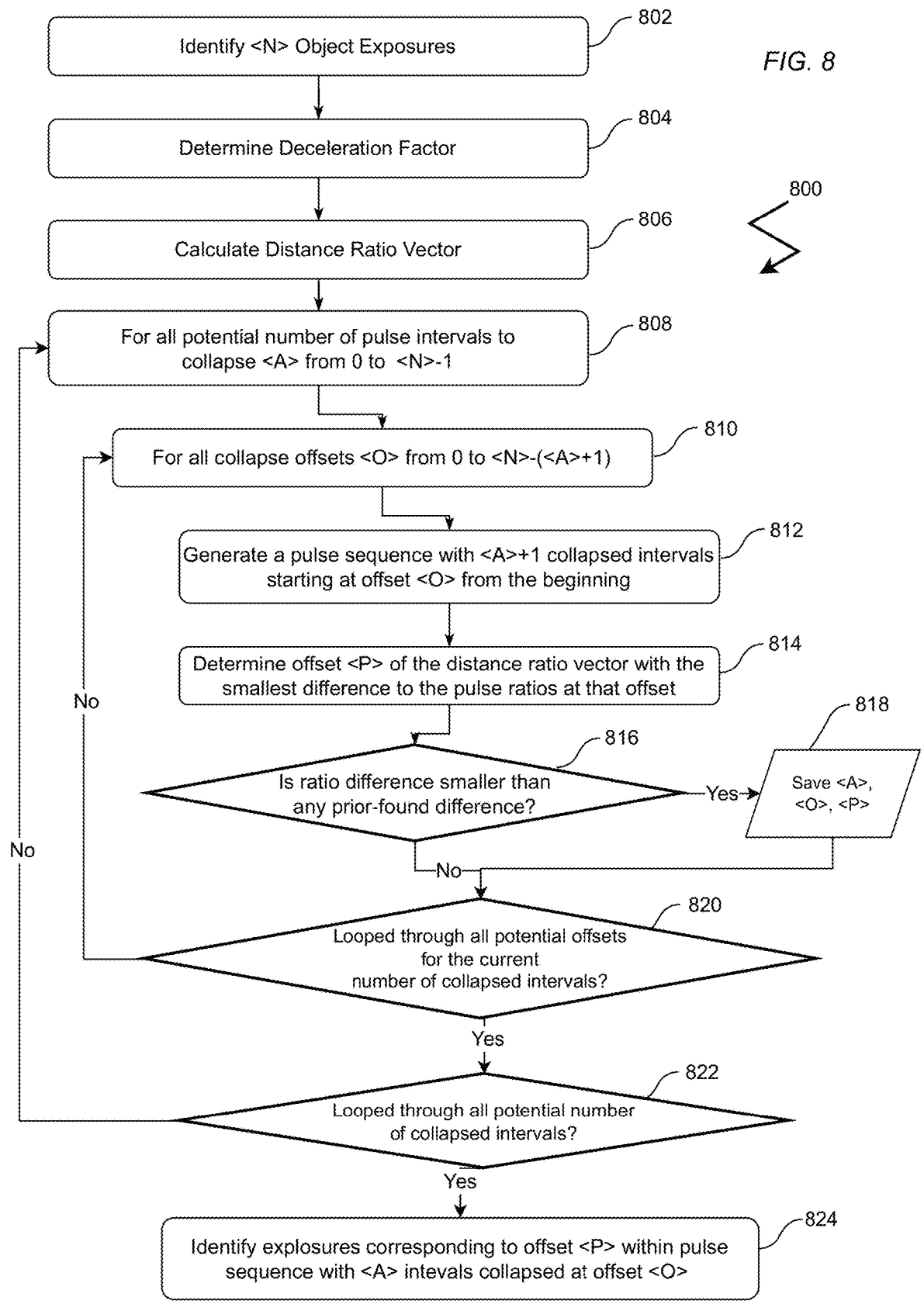
FIG. 8 illustrates an example block diagram depicting operations performed to correlate pulses and exposures.

FIG. 8 illustrates a block diagram 800 depicting operations to correlate illumination pulses and object exposures, as well as the pulse intervals and exposure distances, according to certain embodiments of the present system. In the depicted method, the most probable (lowest error) correlation is found by comparing various sets of exposure distance ratios to pulse interval ratios. Certain embodiments examine not only one-to-one correlations between pulse ratios ands-ingle exposure distance ratios, but also correlations between pulse ratios and multiple distance ratios and where portions of the pulse sequence are collapsed into a smaller number of virtual pulses to accommodate situations in which one or more of the exposures are missing. The operations may be performed on any computing device that is connected to the system, such as devices 121a, 121b, or 140.

At Block 802, a picture having multiple object exposures (potentially similar to exposures shown in FIG. 4), is analyzed to identify the position and other characteristics of a set of object exposures. This analysis may be performed by, for example, the method shown in FIG. 7. If possible, overlapping exposures are identified along with non-overlapping ones. The number of exposures to be analyzed in the rest of the method 800 is denoted as <N> in FIG. 8. For example, the identification could include characteristics such as the X, Y, and Z positions and radius of balls.

At Block 804, a deceleration factor or factors is optionally determined. If the object is light-weight or otherwise strongly influenced by decelerative factors such as aerodynamic drag (e.g., a lightweight practice golf ball), the measured distance ratios may be systemically different than the pulse ratios (even though if the object had moved at constant speed, they should be the same). To account for this potential issue, a factor such as a multiplier or percentage may be calculated based on the known interaction of the object with its environment. For example, for a practice golf ball, a factor of a 1% increase may be created for application to each distance ratio calculated in Block 806.

At Block 806, a vector of the ratios of the distances between adjacent exposures (either in virtual or real-world units) are calculated. The ratios can be calculated with the left-most exposure divided by the right-most or vice-versa, so long as the pulse interval ratios and any deceleration factor are calculated in a consistent manner. An example distance ratio is 431 ratio in FIG. 4.

At Block 808, an outer iteration loop is initiated that will, in turn, change the number of pulse intervals to be collapsed from none (no collapsing), to 1 (two pulse intervals will be combined by summing the intervals and representing the interval between the two later, outer pulses), to 2 (three pulse intervals combined into 1), and so forth. Because it is unusual for the system to fail to identify large numbers of otherwise valid object exposures (especially for later, longer exposure distances), the system may only combine up to about the first one-half the total number of pulses. The number <A> denotes the number of intervals to collapse.

At Block 810, an inner loop iterates in a manner that causes the collapsed pulse intervals to occur at the first two intervals (assuming <A>=1), then at the second two, and later the third two intervals collapsed, and so forth. This moving offset of the collapse can account for situations in which, e.g., the first exposure is correctly identified, but several later exposure(s) are not, for example if in FIG. 4, exposure 412 was recognized and identified but 413 and 414 were not. The offset is denoted in FIG. 9 as <O>.

At Block 812, the system creates a derived sequence of pulses and intervals between the pulses that represents the original pulse sequence, but with a collapsed interval of <A> original intervals starting at original pulse <O>. From this sequence, a vector of one or more pulse ratios is computed between adjacent interval times.

At Block 814, the distance interval ratios (which may be a vector of one or more such intervals) are compared to the pulse ratios at each potential offset of the distance ratio vector into the vector of pulse ratios. The error or distance between the distance ratio(s) and pulse ratio(s) at each offset is calculated, and the lowest such error number is identified as a correlation candidate, at least with respect to the current <A> and <O> values, and the offset of the distance vector into the pulse vector. The error/distance can be calculated by, for example, summing the squares of the absolute value of the pulse ratio minus the distance ratio for each such distance ratio. The best offset of the distance ratios within the (possibly collapsed) pulse interval ratios is denoted in FIG. 8 as <P>.

At Block 816, if the distance calculated at Block 814 is less than any previously-calculated distance, the offset of the distance vector along the interval vectors <P> is recorded at Block 818, along with the current loop values of <O> and <A>, as the current 'best' candidate correlation.

At Blocks 820 and 822, the <A> and <O> loops are continued until finished.

Finally, at Block 824, a pulse vector is created according to the best <O> and <A> values, and the pulse ratios at offset <P> are identified as the ratios to which the pulses that correspond to the exposures are best correlated.

Once the timing between the exposures has been calculated, further calculations such as regarding the velocity, flight trajectory, and launch angles may be calculated using the positions and timing just derived in steps 802 to 824. Characteristics such as the type of the object, e.g., a lightweight practice golf ball versus a real golf ball, may also be incorporated into the calculations to simulate how a related, but different object would react to the same hitting scenario.

Incorporating these different-object calculations allows for scenarios such as having the user golf indoors with a safe, sponge-like practice ball instead of a much faster, harder regulation ball. In this scenario, the system determines the flight characteristics of the particular ball that was hit by the player, and then, using known differences between the practice ball and a real ball, the system can simulate how a real ball would have reacted to the same impact of the golf club. Such differences include weight, aerodynamic drag, and the 'smash' factor (e.g., the amount of deformation of the ball upon impact). For example, reversing factors are calculated that can make up for each of the distances in ball-flight physics between the real and practice ball. Those factors are then applied to the simulated flight of the practice ball to simulate what a real ball would do.

Spin Analysis

For objects such as balls used in sports, the spin of the object is an important characteristic. It is especially important if the complete flight of the ball is to be simulated from observing the object over a short distance, such as in a golf simulator. Spin can heavily influence the projected/simulated flight path and distance of the golf ball had it been hit in a real-world outdoor environment. Embodiments of the present systems can determine the spin rate of an object in three dimensions. For objects such as golf balls, embodiments can determine spin without requiring the addition of fiducials to the ball.

At a high level, embodiments in this disclosure determine spin by comparing two pre-processed exposure images of the object in close physical succession. The first image is projected onto a three-dimensional representation of the object, such as onto a hemisphere or ellipsoid for a golf ball. Next, a set of candidate models are created by rotating that 3D representation in many (possibly hundreds or more) potential combinations of known X, Y, and Z-axis rotations at varying degrees of rotation. Then, a de-projected 2D candidate image is generated from each 3D model rotation. Each 2D candidate is then compared to the second, final image of the ball to see which candidate 'fits' most closely (e.g., looks the most alike) to the final image. The rotational angles in one, two, and/or three axes of the best candidate are then combined with timing information between the first and final images to determine characteristics such as the spin speed of the object.

To enhance and simplify the comparison process, embodiments pre-process the images to highlight relevant surface features such as ball dimples and to remove detail that might otherwise impair the comparisons. Specifically, a filter such as a Gabor filter and binary thresholding is applied to the original two images to perform the preprocessing.

Figure 9:
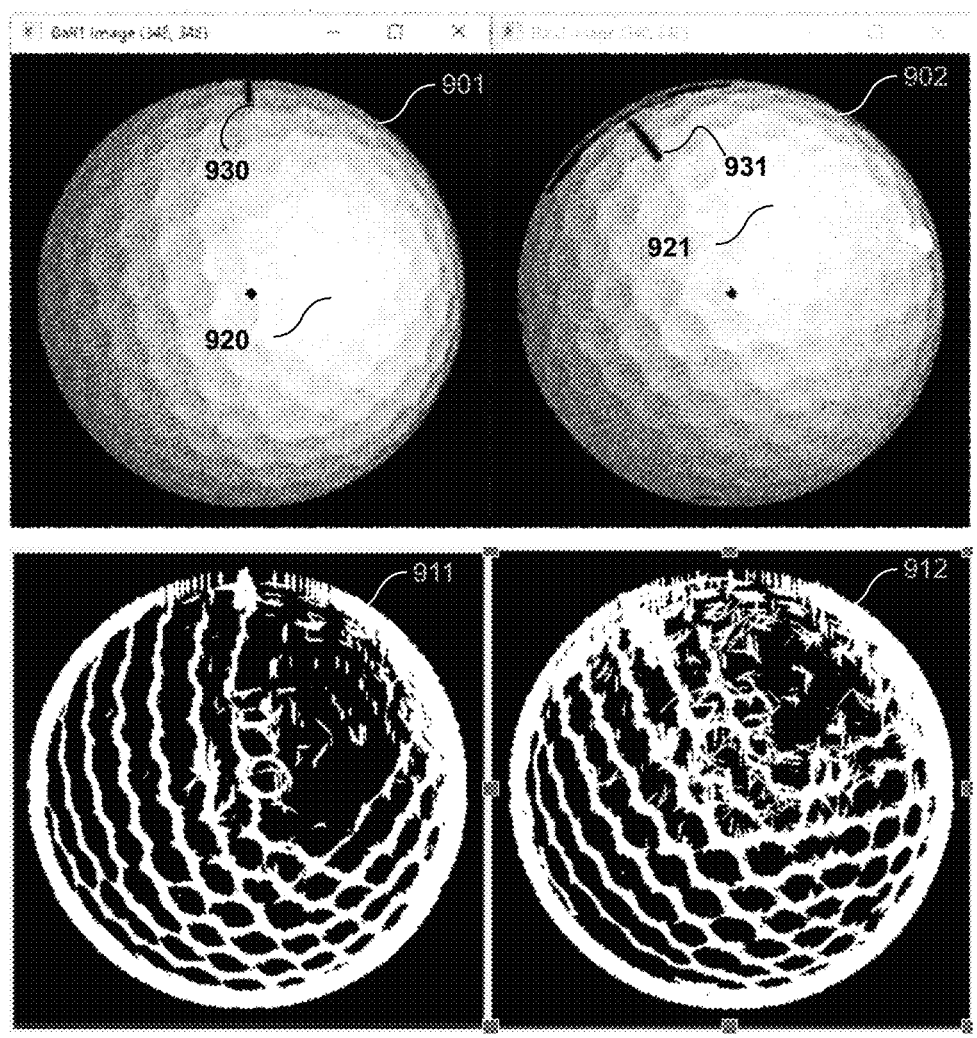
FIG. 9 illustrates an example of processing object images for use in spin analysis.

FIG. 9 shows as an example of two original ball images 901 and 902 and the result of the filtering, 911 and 912.

Each exposure in images such as shown in FIG. 9 may contain visible features such as dimples in the case of a golf ball. The exposures may contain bright ("glint") areas where the illumination light or ambient light reflects into the camera in a manner that creates bright areas, 920 and 921 in FIG. 9. In these areas, little or no surface area can be discerned. The exposures may also comprise fiducials (added marks that may help to calibrate or measure the orientation of the object to the camera), 930 and 931, though fiducials are not required. Visible features can include intentional marks such as a ball number or brand marking, or the stitching on a baseball or a soccer ball. Exposures may also have non-intentionally-made marks such as scratches, scuffs, and dents.

The results 911 and 912 are binary images where each pixel is generally either a 0 or a 1. However, as discussed below, the images are represented and manipulated internally as pseudo gray-scale images (images with, e.g., 255 possible pixel values) to store additional information such as special pixel flags other than 0 or 1 used to control the comparison operations.

A related technique was developed in a research paper, Y. Imai, S. Kagami and K. Hashimoto, "Estimation of a large relative rotation between two images of a fast spinning marker-less golf ball," 2016 *IEEE/SICE International Symposium on System Integration (SII)*, Sapporo, Japan, 2016, pp. 556-561, doi: 10.1109/SII.2016.7844057 (hereinafter the "Imai Paper"). That paper describes a potential embodiment for spin determination using candidate image calculation and comparison. However, in certain embodiments of the present system, various improved techniques and optimizations are used to enhance the reliability and efficiency of the spin evaluation. For example, these techniques allow the analysis to work with only a single camera and as part of the environments in which the present system may be used.

One such technique is to accommodate comparison of images in which portions of the image may be unreliable. The unreliability may be caused by factors such as different view perspectives between the two object images, glint, dark spots, and other areas that cannot be reliably compared for whatever reason.

When using the disclosed multi-exposure techniques, each exposure is generally taken when the object is at a different angle to the camera. This difference in perspective can create challenges if two exposures are to be compared to one another, such as for determining spin. Specifically, the angular differences due to the angle to the camera must be accounted for when examining the spin. Otherwise, when comparing ball exposures such as 415 and 416 in FIG. 4, the ball may look like it rotated from left to right (on the y axis, as the ball moved to the right) even though that did not actually happen. To correct this, embodiments determine the angles from the camera to the exposure images and then pre-rotate the 3D models of the objects to a common angle of reference (e.g., the object as it would be seen straight down the bore of the camera lens) before creating the spin candidates and performing the comparisons.

The pre-rotations (as well as rotations used to create the various candidate rotations) also create a problem because the camera cannot see 'behind' the ball in each 2D image. Thus, the rotations just noted will necessarily rotate at least some of the unseen, unknown portion of the previously-hidden object surface into view. Thus, when the models are de-projected back to 2D images, part of each of the images are essentially blank. For example, two images of a soccer ball that are spaced at a 90-degree angle relative to one another from the camera's perspective will only supply a 90degree, one-fourthcommonand known portion of the total surface of the ball for use in comparisons.

Advantageously, the rotation angles required to make up for camera perspective need not be applied to make each ball look as though it would appear head-on from the camera.

Instead, a difference between the respective X-axis angles from center of the two objects to the camera (and also the Y-axis angles) can be formed and split in half, with each object then rotated by its respective half toward the orientation of the other object. Doing so may reduce the amount of lost surface information that would otherwise be occur.

For example, if one exposure is offset to the right of the center of the view frame by 30 degrees and a second is offset to the right by 40 degrees, the first exposure image can be rotated counter-clockwise (from above, looking down the X axis) by just 5 degrees, and the second can be rotated clockwise by 5 degrees. Doing so creates the same perspective for both balls (35 degrees to the right of the z axis), but without losing any more than 5 degrees of visible surface area for each object (at least for a sphere). The same rotation candidate computations and comparisons may then be performed against the two exposures. Afterward, any spin/angle calculations can then be corrected to account for the effective 35-degree view perspective of the camera.

Regions of the object that are rotated from around the back of the object will contain little if any useful information regarding the surface of the object in those areas. Other areas on the ball are also unhelpful for comparison. For example, bright glint areas may provide few features for purposes such as determining the movement of the surface of the ball. Also, the projection and de-projection of the rotated models result in missing "unmapped" pixels. Such areas may skew the candidate comparison results and detract from the ability to determine characteristics such as spin. An approach to ignoring these areas is valuable.

To accommodate these challenges, embodiments represent the otherwise-problematic areas using one or more special flags instead of normal, thresholded, 0 and 1 pixel values. The image comparison process can then 'score' each rotated candidate by, e.g., counting the number of matching 1-valued or 0-valued pixels between the candidate and final images, while ignoring any pixel that has the flag in either or both images. Specifically, instead of comparing binary images consisting of pixels having only binary (1 or 0) information, a third level of pixel value is used. The third to-be-ignored value can be an arbitrary value used for this purpose to distinguish pixels with that value from the 0 or 1 pixels. For example, representing the image of a ball in grayscale, but only using 0, 1, or 127. When images are compared, the 127-valued pixels are ignored in the comparison. Ultimately, the candidate image with the highest score (the closest match of 0 and 1 pixels), is deemed the 'best' candidate rotation image. The rotation angles of that best image are the most likely spin angles that the object traversed during its movement. The use a pseudo-gray-scale representation allows for simpler and more efficient comparisons, which can be important when hundreds (or more) comparisons must be made.

Too-bright or too-dark portions of the images such as 1021 and 1022 in FIG. 9 can be ignored by setting the bright/dark pixels to the aforementioned flag. Alternatively, a different flag may be used that indicates to the comparison algorithm that there is some information at the specific (X, Y) pixel, but indicating that the pixel may be less useful than others. During the comparison process, such pixels can still contribute to the image comparison score, but at a lower weighting due to the uncertainty. When processing images for comparison, identified bright/dark pixels can effectively be expanded to set special flags in a region of surrounding pixels to further reduce the possibility of inaccurate comparisons.

When rotating the images of embodiments of the present system, several techniques are used to avoid problems that some 'off the shelf' rotation software packages (such as OpenCV) otherwise provide. For example, pixel interpolation, such as bilinear interpolation (common in such packages) is not used to form the rotated image. Instead, the pixels of the object images are rotated using, e.g., 3D matrix multiplication without any interpolation. The non-mapped pixels are then set to the to-be-ignored flag instead of being interpolated from nearby values. The flag value can be set prior to the rotation on all pixels, so that only pixels that are the result of the mapping are 0 or 1.

Another embodiment increases the speed of the comparison process by storing the array of 3D pixel values of the rotation candidates so that the data for the third, Z, dimension is stored at locations in memory afterthe areas of memory that store a matrix of X, Y values. This arrangement allows a de-projection operation from the 3D model to a 2D image for comparison to be accomplished by simply ignoring the later, contiguous section of memory representing the z dimension and re-characterizing the first two-thirds of memory as a contiguous 2D array. In so doing, the matrices are arranged in memory so that the third (Z) dimension can be effectively ignored during the comparison while the comparison operation compares contiguous blocks of memory representing the (X, Y) values of the candidates.

Iterative refinement techniques are used in certain embodiments to reduce the number of rotation candidates and comparisons. A first, coarse, set of rotation candidates are assessed at various delta intervals of rotation in 3D that are relatively large, such as 6 degrees. Local minima or a local minimum in the error distances between the to-be-matched image and each candidate are found for each interval of rotation. Then, a finer set of rotations and comparisons are made in smaller (e.g., 1 degree) increments near and around the best (e.g., smaller error distance) X, Y, Z rotation angle(s) found during the earlier coarse search. In the case of golf balls, these rotation angles are generally associated with the side spin, rifle spin and back spin of the ball, respectively.

The incremental rotation delta interval angles between rotation candidates can be different for the three different dimensions depending on the type of object being assessed. For example, for golf balls, the major amount of rotation, and a predominant factor in determining simulated ball flight, is around the Z axis that emanates from the front of the camera lens toward the ball if the ball is hit across the camera's field of view. Rotation about the X-axis that runs across that field of view is less important. To accommodate this tendency, the coarse and/or fine angle deltas may be smaller for the Z axis than for the other axes.

A potential issue for the monitor system is that the center of one or more of the exposures being used to determine object spin (e.g., the spin axis) may be slightly inaccurate due to factors such as visual noise, rounding errors, and image/lens distortion. If this occurs, the rotation candidates are effectively rotated around different respective points within the object, causing difficulties with accurate comparison of the candidates to the reference image. To help correct for this issue, the initial set of candidates described above may be augmented with additional sets. The additional sets are rotated in the same candidate positions and angles, but the pre-rotated reference image is translated (offset) laterally or vertically by a small amount in combination with the rotation. This offset provides a potentially better match if there is some inaccuracy in the positioning of the point about which the rotations occur. Alternatively, only a single set of 3D rotations is computed, but when the comparison step with the reference image is performed, it is also performed on a set of translated versions of the reference object. This technique can help provide stronger 'matches' between the reference and candidate images. The spin calculations from the best offset comparison may be used directly for very small translation offsets, or by using geometric techniques to directly account for the altered spin calculations for increased accuracy.

Figure 10:
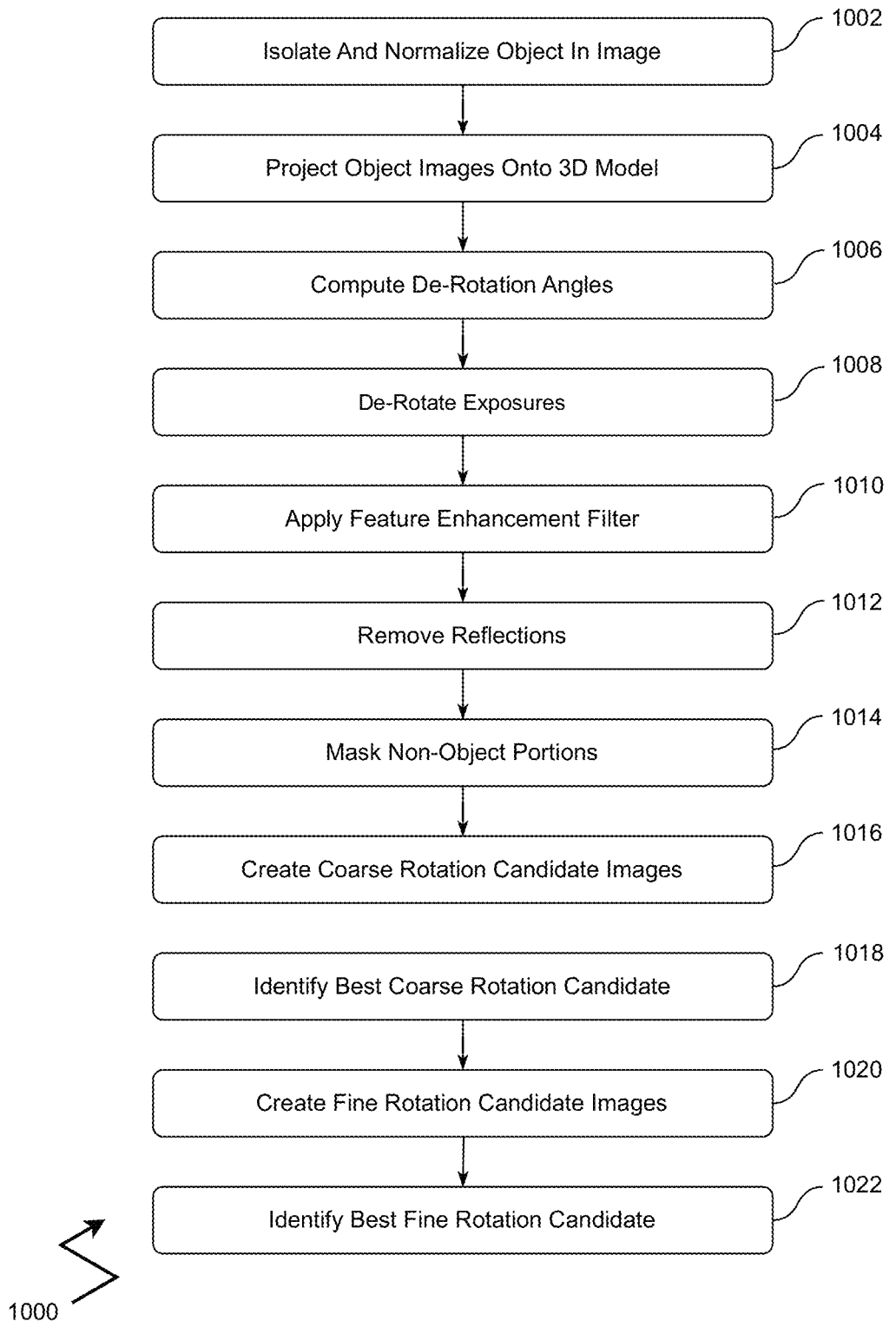
FIG. 10 illustrates an example block diagram depicting operations performed to determine an object's rotational speeds.

FIG. 10 is a block diagram 1000 depicting the operations performed to determine object spin rates and/or orientation according to certain embodiments of the present system. In the depicted method, an initial set of two object exposures is identified to analyze. The operations may be performed on any computing device that is connected to the system, such as devices 121*a*, 121*b*, or 140.

At Block 1002, the object images are isolated and separated from any surrounding portions of the image that are not a part of the object, and the sizes of the objects are normalized. The isolation will, for example, take an image of a circular ball and crop the image so that extraneous information is, to the extent practical, eliminated. The result could be a square that encompasses the circle of the ball, but nothing else. The normalization process includes sizing the image to be the same size as the other object image, or re-sizing the images to some chosen common size so that both images are the same size. The normalization may also include making the image square and centering the object (such as the circle of a ball) within the normalized image. The to-be-ignored flag discussed earlier may be used to mark non-relevant areas, such as between the circular object and the edges of the square-shaped image that contains the image of that object.

At Block 1004, the two object exposure images are projected from flat 2D images onto corresponding 3D images. The projection is performed based on the known/expected shape of the object, such as a hemisphere for the visible portion of ball objects.

At Block 1006, de-rotation angles are determined to bring both the initial and final images to a common reference angle so that they may be compared. The angles may be distributed between the two images so that one image is rotated by <a> degrees and the other by <-a> degrees. Alternatively, both images can be shifted so that each image appears as it would have appeared if taken straight down the bore of the camera/sensor. For example, for an object in FIG. 2 at angle 150, the de-rotation angle would be the negative of angle 150. Any pixels of the image that are rotated from behind the view of the original image will be marked with a flag designating that those pixels should not be used in subsequent comparisons.

At Block 1008, using the determined de-rotation angles, the 3D models are de-rotated so that the axes of rotation are the same or similar for each model. Areas of the resulting 3D surface that were rotated from unseen/unsensed areas of the actual object (such as from behind a ball) are set to a flag value, e.g., 127, denoting the area as unknown in value.

At Block 1010, image processing is performed to highlight and enhance areas of the object surface that are most useful for determining the object's orientation. For example, for a golf ball whose dimples are useful for tracking the spin movement of the ball, a Gabor filter may be applied, such as the Gabor filter included as part of OpenCV. For that filter, potential parameters are: kernel_size=21; sigma=2; lambda=6; gamma=4; theta=60; psi =9; binary_threshold=8. After the initial identification of the object(s), additional image processing may be performed to further refine the initially-computed object characteristics. For example, a second Hough identification using tightened parameters or a separate elliptical identification technique may be applied in and around the area near the original object extent approximation.

At Block 1012, portions of the image exposure that appear to be over-exposed (bright) areas are set to a special flag value so that the overexposed pixels will not be evaluated during subsequent image comparisons. The determination of a pixel as bright can be performed using, for example, an algorithm that determines which pixels have a maximum value (e.g., 255 out of 255), or are far above the more typical pixel values, such as being more than two sigmas from the median. Each such bright pixel may be widened for purposes of setting the pixels within a certain localized area near the pixel to also have the special 'ignore' flag. Doing so helps ensure that areas of the image in whose values the system has low confidence are excluded from later computations. Widening ratios of 1.5 to 2.5 are used in some embodiments.

At Block 1014, pixels in portions of the (typically) square image that do not portray relevant parts of the object (such as the corners of a square image with a circular ball inside) are marked as to-be-ignored by using some special pixel flag value, such as 127.

At Block 1016, a set of coarse rotation candidate images are generated. First, a range of potential rotation ranges and rotation increments are established. Next, for each permutation of potential incremental rotations within the rotation range in the X, Y, and Z axes, a candidate 3D model of the rotated image is formed. Finally, each 3D model is de-projected to a 2D image. The de-projection process may include applying morphological operations such as dilation and opening to the image.

At Block 1018, the coarse rotation candidates are evaluated. Each pixel of each candidate image that is not marked as a flag to be ignored is compared to each pixel of the final image. A score is generated for each candidate, based on the number of pixels that have the same value as the corresponding pixel in the final image (or a value that is within some range of the final image's pixel values). The candidate with the highest score is deemed to be the most likely candidate among the group of candidates being compared.

At Block 1020, the angles associated with the best coarse candidate image are used to generate a set of candidate angles that are relatively close to the coarse candidate angles, but that are separated by a smaller (fine) set of degree increments than the original coarse set. Doing so allows the system to find a more exact rotational match than the coarse comparisons could provide but without taking as much processing time. Using the fine set of angles, a set of fine rotation candidate images are generated.

At Block 1022, each fine rotation candidate is compared to the final image in a manner similar to that in Block 1018. The rotation angles associated with the closest match are deemed to be the best estimate of the angular rotation of the ball from the time of the first image to the final image. The time between the candidate image exposure and the final image exposure is then used to determine the rotation rate in one, two or three dimensions.

The descriptions and drawings of this disclosure illustrate various aspects of the subject matter and are not necessarily to scale. In the detailed description and in the drawings themselves, specific illustrative examples are shown and described in detail. The drawings and the detailed description are not intended to limit the present systems and methods to the particular forms disclosed, but are merely illustrative of the systems and methods claimed herein.

As used in this application and in the claims, the singular forms "a," "an," and "the" include the plural forms unless the context clearly dictates otherwise. Additionally, the term "includes" means "comprises." Further, the term "coupled" encompasses mechanical as well as other ways of coupling or linking items together, and does not exclude the presence of intermediate elements between the coupled items.

Although the operations of some of the disclosed methods are described in a particular, sequential order for convenient presentation, this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and method.

In this disclosure, certain terms may be used such as "up," "down," "upper," "lower," "horizontal," "vertical," "left," "right," and the like. These terms are used, where applicable, to provide some clarity of description when dealing with relative relationships. But these terms are not intended to imply absolute relationships, positions, and/or orientations.

Any of the disclosed methods can be implemented as computer-executable instructions stored on one or more computer-readable storage media (e.g., one or more optical media discs, volatile memory components (e.g., DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any particular computer or type of hardware. The functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The invention claimed is:

1. A method for determining parameters of an object in motion, the method comprising the steps of:
   capturing a plurality of exposures of the object wherein each exposure is illuminated at least in part by a respective illumination pulse in a plurality of pulses;
   determining a pulse ratio of:
      a first time interval between a first pair of illumination pulses, and
      a second time interval between a second, different pair of pulses,
      wherein the first and second time intervals differ from each other in length;
   determining a distance ratio of:
      a first distance between objects in a first pair of exposures and
      a second distance between objects in a second, different pair of exposures;
   determining a correlation between the pulse ratio and the distance ratio;
   using the correlation to estimate a time between when two exposures in the plurality of exposures of the object were captured; and
   using the time estimate to determine at least one of the object's velocity, position, speed, trajectory, or spin.

2. The method of claim 1, wherein the first pulse time interval is created by combining two or more pulse intervals into a virtual first pulse interval, the virtual interval comprising the sum of the two or more actual pulse intervals.

3. The method of claim 1, wherein the determining a correlation comprises comparing the distance ratio to the pulse ratio.

4. The method of claim 1, wherein the determined pulse ratio is different than other pulse ratios of other pulse time intervals in the plurality of pulses.

5. The method of claim 1, wherein, on average, the time intervals increase as between pairs of adjacent pulses that occur earlier in time and pairs of adjacent pulses that occur later.

6. The method of claim 1, wherein at least one of the plurality of exposures selected for use in determining the correlation are selected by at least one of: comparing that object's distance to another object, comparing the color of the one object to another object, and comparing the position of the one object to a computed trajectory.

7. The method of claim 1, wherein the object is a golf ball.

8. A system for measuring characteristics of an object in motion, the system comprising:
   an illumination source for illuminating the object;
   a camera for capturing at least one image,
   a memory device coupled to the camera for storing images; and
   a processor coupled to the memory device, the processor adapted to perform the following steps:
      capturing an image, the image including a plurality of exposures of the object, each exposure being substantially illuminated by a respective pulse of the illumination source;
      determining a plurality of distances between the object exposures;
      determining a plurality of intervals between the pulses, at least one interval being substantially longer than another;
      determining a correlation between a ratio of two of the pulse intervals and a ratio of two of the plurality of distances; and
      using the correlation to measure at least one of the object's position, speed, trajectory, or spin; and
   an interface for use in communicating the determined measurement.

9. The system of claim 8, wherein at least one of the plurality of pulse intervals is created by combining two or more pulse intervals into a virtual pulse interval, the virtual interval comprising the sum of the two or more actual pulse intervals.

10. The system of claim 8, wherein the determining a correlation comprises comparing the distance ratio to the pulse ratio.

11. The system of claim 8, wherein, on average, the time intervals increase as between pairs of adjacent pulses that occur earlier in time and pairs of adjacent pulses that occur later.

12. The system of claim 8, wherein at least one of the plurality of exposures selected for use in determining the correlation are selected by at least one of: comparing that object's distance to another object, comparing the color of the one object to another object, and comparing the position of the one object to a computed trajectory.

13. The system of claim 8, wherein the object is a golf ball.

14. A non-transitory computer readable medium that, when executed by a computer, causes the computer to perform a method comprising the steps of:
   capturing a plurality of exposures of an object wherein each exposure is illuminated at least in part by a respective illumination pulse in a plurality of pulses;
   determining a pulse ratio of:
      a first time interval between a first pair of illumination pulses, and
      a second time interval between a second, different pair of pulses,
      wherein the first and second time intervals differ from each other in length;
   determining a distance ratio of:
      a first distance between objects in a first pair of exposures and
      a second distance between objects in a second, different pair of exposures;
   determining a correlation between the pulse ratio and the distance ratio;
   using the correlation to estimate a time between when two exposures in the plurality of exposures of the object were captured; and
   using the time estimate to determine at least one of the object's velocity, position, speed, trajectory, or spin.

15. A non-transitory computer readable medium of claim 14, wherein the first pulse time interval is created by combining two or more pulse intervals into a virtual first pulse interval, the virtual interval comprising the sum of the two or more actual pulse intervals.

16. A non-transitory computer readable medium of claim 14, wherein the determining a correlation comprises comparing the distance ratio to the pulse ratio.

17. A non-transitory computer readable medium of claim 14, wherein the determined pulse ratio is different than other pulse ratios of other pulse time intervals in the plurality of pulses.

18. A non-transitory computer readable medium of claim 14, wherein, on average, the time intervals increase as between pairs of adjacent pulses that occur earlier in time and pairs of adjacent pulses that occur later.

19. A non-transitory computer readable medium of claim 14, wherein at least one of the plurality of exposures selected for use in determining the correlation are selected by at least one of: comparing that object's distance to another object, comparing the color of the one object to another object, and comparing the position of the one object to a computed trajectory.

20. A non-transitory computer readable medium of claim 14, wherein the object is a golf ball.

\* \* \* \* \*